US010159054B2

(12) United States Patent
Li

(10) Patent No.: US 10,159,054 B2
(45) Date of Patent: Dec. 18, 2018

(54) DEVICE AND DEVICE SYNCHRONIZATION METHOD IN DEVICE-TO-DEVICE (D2D) COMMUNICATION

(71) Applicant: Huawei Technologies Co., Ltd., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 15/217,450

(22) Filed: Jul. 22, 2016

(65) Prior Publication Data
US 2016/0330709 A1 Nov. 10, 2016

Related U.S. Application Data

(63) Continuation of application No. PCT/CN2014/071373, filed on Jan. 24, 2014.

(51) Int. Cl.
*H04W 56/00* (2009.01)
*H04W 76/14* (2018.01)
(Continued)

(52) U.S. Cl.
CPC ......... *H04W 56/0015* (2013.01); *H04L 43/16* (2013.01); *H04L 45/122* (2013.01); *H04W 56/0025* (2013.01); *H04W 76/14* (2018.02)

(58) Field of Classification Search
CPC ............... H04W 4/005; H04W 56/001; H04W 56/0015; H04W 56/0025; H04W 76/023; H04L 43/16; H04L 45/122
See application file for complete search history.

(56) References Cited

U.S. PATENT DOCUMENTS

2014/0153440 A1  6/2014  Zhou et al.
2016/0050702 A1* 2/2016  Sorrentino ........ H04W 56/0025
                                                              370/329
(Continued)

FOREIGN PATENT DOCUMENTS

CN  102165840 A  8/2011
CN  103108389 A  5/2013
(Continued)

OTHER PUBLICATIONS

3rd Generation Partnership Project; Technical Specification Group Radio Access Network; Small cell enhancements for E-UTRA and E-UTRAN-Physical layer aspects (Release 12), 3GPP TR 36.872 V12.1.0 (Dec. 2013), 100 pages.
(Continued)

*Primary Examiner* — Paul H Masur
(74) *Attorney, Agent, or Firm* — Slater Matsil, LLP

(57) ABSTRACT

A device and a device synchronization method in D2D communication, so as to implement synchronization between devices in D2D communication is provided. The device includes: a receiving unit, configured to receive first D2D synchronization information sent by a first device in D2D communication, where the first D2D synchronization information includes a synchronization source identifier and a forwarding hop count. The device also includes a processing unit, configured to synchronize with a synchronization source corresponding to the synchronization source identifier in the first D2D synchronization information, and update the forwarding hop count in the first D2D synchronization information when determining that the forwarding hop count in the first D2D synchronization information is less than a set threshold, so as to obtain second D2D synchronization information. The device also includes a sending unit, configured to send the second D2D synchronization information.

20 Claims, 10 Drawing Sheets

(51) Int. Cl.
*H04L 12/26* (2006.01)
*H04L 12/733* (2013.01)

(56) References Cited

U.S. PATENT DOCUMENTS

| | | | | |
|---|---|---|---|---|
| 2016/0212724 | A1* | 7/2016 | Seo | H04W 56/0025 |
| 2016/0227495 | A1* | 8/2016 | Lee | H04W 56/00 |
| 2016/0227496 | A1* | 8/2016 | Panteleev | H04W 36/0055 |
| 2016/0242131 | A1* | 8/2016 | Popovic | H04B 1/7073 |
| 2016/0286506 | A1* | 9/2016 | Chae | H04W 56/002 |
| 2017/0230922 | A1* | 8/2017 | Zhao | H04L 5/14 |

FOREIGN PATENT DOCUMENTS

| | | |
|---|---|---|
| EP | 1976165 A2 | 10/2008 |
| JP | 2016502811 A | 1/2016 |

OTHER PUBLICATIONS

3rd Generation Partnership Project; Technical Specification Group Radio Access Network; Evolved Universal Terrestrial Radio Access (E-UTRA); Physical channels and modulation (Release 11); 3GPP TS 36.211 V11.5.0 (Dec. 2013), 120 pages.

3rd Generation Partnership Project; Technical Specification Group Radio Access Network; Evolved Universal Terrestrial Radio Access (E-UTRA); Radio Resource Control (RRC); Protocol specification (Release 9), 3GPP TS 36.331 V9.16.0 (Sep. 2013), 262 pages.

Ericsson et al., "WF on the D2D Synchronization Procedure," 3GPP draft; R1-135929, agenda item 6.2.8.1.1, downloaded Nov. 13, 2013, 2 pages.

Intel Corporation, "Discussion on D2D Synchronization," 3GPP TSG RAN WG1 Meeting #75, R1-135113, San Francisco, CA, USA, Nov. 11-15, 2013, 8 pages.

Qualcomm Inc., "D2D Synchronization for Out of Coverage and Partial Network Coverage," 3GPP TSG-RAN WG1 074bis, R1-134624, Guangzhou, China, Oct. 7-11, 2013, 6 pages.

Samsung, "Time Synchronization for D2D Broadcast Communication in Out of Network Coverage," 3GPP TSG RAN WG1 Meeting #75, R1-135219, San Francisco, CA, USA, Nov. 11-15, 2013, 6 pages.

Qualcomm Inc., "Multi-hop D2D synchronization performance," 3GPP TSG-RAN WG1 #75, R1-135316, San Francisco, CA USA, Nov. 11-15, 2013, 7 pages.

3GPP, 3rd Generation Partnership Project; Technical Specification Group RAN; Study on LTE Device to Device Proximity Services-Radio Aspects; (Release 12), 3GPP TR 36.843 V1.0.0 (Nov. 2013), 32 pages.

* cited by examiner

DEVICE AND DEVICE SYNCHRONIZATION METHOD IN DEVICE-TO-DEVICE (D2D) COMMUNICATION

CROSS-REFERENCE TO RELATED APPLICATIONS

This application is a continuation of International Application No. PCT/CN2014/071373, filed on Jan. 24, 2014, which is hereby incorporated by reference in its entirety.

TECHNICAL FIELD

The present invention relates to the field of communications technologies, and in particular, to a device and a device synchronization method in device-to-device (D2D) communication.

BACKGROUND

In a device-to-device (D2D) communication manner, devices can communicate with each other by using a particular mechanism without transit by a base station; therefore, communication can be implemented in a place where network facilities are inadequate or no network is available. However, during D2D communication, each device has a right and an opportunity to initiate communication, but stability of time and frequency of user equipment (UE) is poorer than that of a base station, and different UEs apply different time and frequency references. If each UE randomly transmits a synchronization signal, receiver UE will be unable to determine a synchronization reference, and as a result, communication cannot be established.

In a Long Term Evolution (LTE) system, a synchronization mechanism based on a two-step method is provided. The synchronization mechanism involves one primary synchronization signal (PSS) and one secondary synchronization signal (SSS). A cell identifier is allocated to a base station, and the PSS and the SSS are used to indicate the cell identifier. UE selects a serving cell after power-on and synchronizes to the selected serving cell by using the PSS and the SSS. That is, UEs that belong to different cells synchronize to different base stations. A synchronization method is: UE receives, by using a receiver, a PSS and an SSS that are sent by a base station and tracks the PSS and the SSS, and aligns time and frequency with that of a base station that provides a service for the UE. Base stations synchronize time and frequency to a unified synchronization source by using a global positioning system (GPS), or the like.

In an LTE downlink communication mechanism, in a cell, only one transmitter transmits a synchronization signal, and all UEs synchronize to the cell. However, in a D2D scenario, each UE may send a synchronization signal, and an LTE two-step synchronization mechanism does not suit such a distributed network structure of D2D. It can be seen that how to implement synchronization between devices in D2D communication is an issue to be resolved.

SUMMARY

Embodiments provide a device and a device synchronization method in D2D communication, so as to implement synchronization between devices in D2D communication.

Specific technical solutions provided in the embodiments are as follows.

According to a first aspect, a device in device-to-device D2D communication is provided. The device includes a receiving unit, configured to receive first D2D synchronization information sent by a first device in D2D communication, where the first D2D synchronization information includes a synchronization source identifier and a forwarding hop count. The device also includes a processing unit, configured to synchronize with a synchronization source corresponding to the synchronization source identifier in the first D2D synchronization information; and update the forwarding hop count in the first D2D synchronization information when determining that the forwarding hop count in the first D2D synchronization information is less than a set threshold, so as to obtain second D2D synchronization information. The device also includes a sending unit, configured to send the second D2D synchronization information.

With reference to the first aspect, in a first possible implementation manner, the first D2D synchronization information received by the receiving unit is carried in a D2D synchronization signal sent by the first device; or the first D2D synchronization information received by the receiving unit includes first-part D2D synchronization information and second-part D2D synchronization information, where the first-part D2D synchronization information is carried in a D2D synchronization signal sent by the first device, and the second-part D2D synchronization information is sent by the first device through a physical D2D synchronization channel PD2DSCH.

With reference to the first possible implementation manner of the first aspect, in a second possible implementation manner, a transmission cycle of the D2D synchronization signal and a transmission cycle of the PD2DSCH are different.

With reference to the first possible implementation manner of the first aspect, in a third possible implementation manner, the D2D synchronization signal includes a primary D2D synchronization signal PD2DSS and/or a secondary D2D synchronization signal SD2DSS.

With reference to the third possible implementation manner of the first aspect, in a fourth possible implementation manner, the processing unit is specifically configured to: determine, according to a preset correspondence between an SD2DSS and a synchronization source identifier, a synchronization source identifier that is corresponding to the SD2DSS, carried in the D2D synchronization signal, and received by the receiving unit; and synchronize with a synchronization source corresponding to the determined synchronization source identifier; determine, according to a preset correspondence between a PD2DSS and a forwarding hop count, a forwarding hop count that is corresponding to the PD2DSS, carried in the D2D synchronization signal, and received by the receiving unit; and when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; and after the PD2DSS in the D2D synchronization signal received by the receiving unit is replaced with the determined PD2DSS, use a D2D synchronization signal with the replaced PD2DSS as the second D2D synchronization information.

With reference to the third possible implementation manner of the first aspect, in a fifth possible implementation manner, the processing unit is specifically configured to: determine a synchronization source identifier according to indication information, received by the receiving unit based on the PD2DSCH, of the synchronization source identifier; and synchronize with a synchronization source corresponding to the determined synchronization source identifier; determine, according to a preset correspondence between a PD2DSS and a forwarding hop count, a forwarding hop count that is corresponding to the PD2DSS, carried in the D2D synchronization signal, and received by the receiving unit. The processing unit is also configured to, when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; and after the PD2DSS in the received D2D synchronization signal is replaced with the determined PD2DSS, use a D2D synchronization signal obtained after PD2DSS replacement as first-part D2D synchronization information of the second D2D synchronization information, and use the indication information of the synchronization source identifier as second-part D2D synchronization information that is sent through the PD2DSCH and that is of the second D2D synchronization information, to obtain the second D2D synchronization information.

With reference to the third possible implementation manner of the first aspect, in a sixth possible implementation manner, the processing unit is specifically configured to: determine, according to a preset correspondence between an SD2DSS and a synchronization source identifier, a synchronization source identifier that is corresponding to the SD2DSS, carried in the D2D synchronization signal, and received by the receiving unit; and synchronize with a synchronization source corresponding to the determined synchronization source identifier. The processing unit is also configured to determine a forwarding hop count according to indication information, received by the receiving unit based on the PD2DSCH, of the forwarding hop count; when the determined forwarding hop count is less than the set threshold, use a sum of the determined forwarding hop count and a set value as a current forwarding hop count; and use the D2D synchronization signal that carries the SD2DSS as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information.

With reference to the third possible implementation manner of the first aspect, in a seventh possible implementation manner, the processing unit is specifically configured to: determine, according to a preset correspondence between an SD2DSS and a synchronization source identifier and between an SD2DSS and a forwarding hop count, a synchronization source identifier and a forwarding hop count that are corresponding to the SD2DSS, carried in the D2D synchronization signal, and received by the receiving unit; and synchronize with a synchronization source corresponding to the determined synchronization source identifier. The processing unit is also configured to, when the determined forwarding hop count is less than the set threshold, use a sum of the determined forwarding hop count and a set value as a current forwarding hop count; determine, according to the preset correspondence between an SD2DSS and a synchronization source identifier and between an SD2DSS and a forwarding hop count, an SD2DSS corresponding to the synchronization source identifier and the current forwarding hop count; replace the SD2DSS in the D2D synchronization signal with the determined SD2DSS; and use a D2D synchronization signal obtained after SD2DSS replacement as the second D2D synchronization information.

With reference to the seventh possible implementation manner of the first aspect, in an eighth possible implementation manner, the preset correspondence between an SD2DSS and a synchronization source identifier and between an SD2DSS and a forwarding hop count includes: the preset correspondence between an SD2DSS and a forwarding hop count satisfying $N_k = \mathrm{mod}(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

With reference to the third possible implementation manner of the first aspect, in a ninth possible implementation manner, the processing unit is specifically configured to: determine, according to a preset correspondence between a synchronization source identifier and a combination of a PD2DSS and an SD2DSS, a synchronization source identifier that is corresponding to a combination of the PD2DSS and the SD2DSS, carried in the D2D synchronization signal, and received by the receiving unit; and synchronize with a synchronization source corresponding to the determined synchronization source identifier. The processing unit is further configured to determine a forwarding hop count according to indication information, received by the receiving unit based on the PD2DSCH, of the forwarding hop count; and when the determined forwarding hop count is less than the set threshold, use a sum of the determined forwarding hop count and a set value as a current forwarding hop count. The processing unit is further configured to use the D2D synchronization signal as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information.

With reference to the ninth possible implementation manner of the first aspect, in a tenth possible implementation manner, the preset correspondence between a synchronization source identifier and a combination of a PD2DSS and an SD2DSS includes: the preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s - 1)$, $0 \leq N_{ID}^{(2)} \leq (N_s - 1)$, $M_s$ represents a maximum quantity of PD2DSSes, and $N_s$ represents a maximum quantity of SD2DSSes.

With reference to the third possible implementation manner of the first aspect, in an eleventh possible implementation manner, the processing unit is specifically configured to: determine, according to a preset correspondence between a synchronization source identifier and a PD2DSS-SD2DSS group, a synchronization source identifier that is corresponding to a PD2DSS-SD2DSS group to which a combination of the PD2DSS and the SD2DSS, carried in the D2D synchronization signal, and received by the receiving unit belongs; and synchronize with a synchronization source corresponding to the determined synchronization source identifier; and determine, according to a preset correspondence between an SD2DSS and a forwarding hop count, a forwarding hop count that is corresponding to the SD2DSS in the combination of the PD2DSS and the SD2DSS that are carried in the received D2D synchronization; when the determined forwarding hop count is less than the set threshold, use a sum of the determined forwarding hop count and a set value as a current forwarding hop count; acquire, according to the preset correspondence between an SD2DSS and a forwarding hop count, an SD2DSS corresponding to the current forwarding hop count; determine a combination of a PD2DSS and an SD2DSS that is corresponding to the acquired SD2DSS and that is included in the PD2DSS-SD2DSS group to which the combination of the PD2DSS and the SD2DSS carried in the D2D synchronization signal belongs; replace the combination of the PD2DSS and the SD2DSS in the D2D synchronization signal with the determined combination of the PD2DSS and the SD2DSS; and use a D2D synchronization signal obtained after replacement of the combination of the PD2DSS and the SD2DSS as the second D2D synchronization information.

With reference to the eleventh possible implementation manner of the first aspect, in a twelfth possible implementation manner, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

With reference to the twelfth possible implementation manner of the first aspect, in a thirteenth possible implementation manner, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

With reference to any one of the first aspect to the thirteenth possible implementation manner of the first aspect, in a fourteenth possible implementation manner, the processing unit is further configured to: when determining that the receiving unit receives more than one piece of first D2D synchronization information, separately acquire forwarding hop counts carried in the received pieces of first D2D synchronization information; determine a minimum value of the acquired forwarding hop counts; and when determining that the minimum value is less than the set threshold, synchronize with a synchronization source corresponding to a synchronization source identifier in the first D2D synchronization information corresponding to the minimum value.

With reference to the fourteenth possible implementation manner of the first aspect, in a fifteenth possible implementation manner, the processing unit is specifically configured to: when the minimum value is corresponding to more than one piece of first D2D synchronization information, determine signal strengths of the pieces of first D2D synchronization information corresponding to the minimum value; and perform synchronization according to the first D2D synchronization information corresponding to a greatest value of the signal strengths.

With reference to any one of the first aspect to the fourteenth possible implementation manner of the first aspect, in a sixteenth possible implementation manner, the first D2D synchronization information further carries a synchronization source type. The processing unit is specifically configured to: when determining that the receiving unit receives more than one piece of first D2D synchronization information, determine, according to synchronization source types carried in the pieces of first D2D synchronization information, the first D2D synchronization information in which a synchronization source is a network; and perform synchronization according to the determined first D2D synchronization information.

With reference to the sixteenth possible implementation manner of the first aspect, in a seventeenth possible implementation manner, the processing unit is specifically configured to: after determining the first D2D synchronization information in which the synchronization source is a network, acquire a forwarding hop count carried in the determined first D2D synchronization information in which the synchronization source is a network; and if determining that the forwarding hop count is less than the set threshold, perform synchronization according to the determined first D2D synchronization information in which the synchronization source is a network; or if determining that the forwarding hop count is not less than the set threshold, acquire forwarding hop counts carried in the other pieces of first D2D synchronization information; determine a minimum value of the acquired forwarding hop counts; and when determining that the minimum value is less than the set threshold, synchronize with a synchronization source indicated by a synchronization source identifier in the first D2D synchronization information corresponding to the minimum value.

With reference to the sixteenth possible implementation manner of the first aspect, in an eighteenth possible implementation manner, the processing unit is specifically configured to: update a greatest value of the forwarding hop counts, where a greatest value of the forwarding hop counts that is obtained after the update is greater than the greatest value of the forwarding hop counts that exists before the update; and when determining that the forwarding hop count carried in the first D2D synchronization information is less than the greatest value of the forwarding hop counts that is obtained after the update, update the forwarding hop count in the first D2D synchronization information, to obtain the second D2D synchronization information, where the sending unit sends the second D2D synchronization information, and the sending unit sends the greatest value of the forwarding hop counts that is obtained after the update.

With reference to any one of the first possible implementation manner to the fourteenth possible implementation manner of the first aspect, in a nineteenth possible implementation manner, the sending unit is specifically configured to: when the receiving unit receives a D2D synchronization signal by using any one of radio frames used for sending a D2D synchronization signal, transmit a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

With reference to any one of the first possible implementation manner to the fourteenth possible implementation manner of the first aspect, in a twentieth possible implementation manner, the sending unit is specifically configured to: when the receiving unit receives a D2D synchronization signal by using any resource that is used for a D2D synchronization signal and that is included in a radio frame used for sending a D2D synchronization signal, send a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

With reference to any one of the first possible implementation manner to the fourteenth possible implementation manner of the first aspect, in a twenty-first possible implementation manner, the sending unit is specifically configured to: after determining that a D2D synchronization signal needs to be sent, send only the D2D synchronization signal within a set quantity of transmission cycles; and the receiving unit does not receive any D2D synchronization signal within the set quantity of transmission cycles.

According to a second aspect, a device in device-to-device D2D communication is provided. The device includes a message processing unit, configured to determine a synchronization source identifier and a forwarding hop count; and encapsulate the determined synchronization source identifier and forwarding hop count into first D2D synchronization information. The device also includes a sending unit, configured to send the first D2D synchronization information processed by the message processing unit.

With reference to the second aspect, in a first possible implementation manner, the first D2D synchronization information further includes a synchronization source type. The device further includes a detection unit and a receiving unit, where the detection unit is configured to detect a downlink synchronization signal sent by a network. The message processing unit is further configured to: when determining that the detection unit has not detected the downlink synchronization signal, instruct the sending unit to send the first D2D synchronization information; or after determining that the detection unit has detected the downlink synchronization signal, determine that the receiving unit has received third D2D synchronization information sent by another device; determine, according to a synchronization source type in the third D2D synchronization information, that a synchronization source is not a network device; and instruct the sending unit to send the first D2D synchronization information.

With reference to the first possible implementation manner of the second aspect, in a second possible implementation manner, a time-frequency occupied by the first D2D synchronization information that is sent by the sending unit is different from a time-frequency resource occupied by the downlink synchronization signal that is sent by the network and that is received by the receiving unit.

With reference to the first possible implementation manner of the second aspect, in a third possible implementation manner, the sending unit is specifically configured to: send a D2D synchronization signal, where the D2D synchronization signal carries the first D2D synchronization information; or send a D2D synchronization signal, where the D2D synchronization signal carries first-part D2D synchronization information of the first D2D synchronization information; and send second-part D2D synchronization information of the first D2D synchronization information through a physical D2D synchronization channel PD2DSCH, where the first-part D2D synchronization information and the second-part D2D synchronization information are combined into the first D2D synchronization information.

With reference to the third possible implementation manner of the second aspect, in a fourth possible implementation manner, a transmission cycle of the D2D synchronization signal and a transmission cycle of the PD2DSCH are different.

With reference to the third possible implementation manner of the second aspect, in a fifth possible implementation manner, the D2D synchronization signal includes a primary D2D synchronization signal PD2DSS and/or a secondary D2D synchronization signal SD2DSS.

With reference to the fifth possible implementation manner of the second aspect, in a sixth possible implementation manner, the message processing unit is specifically configured to: acquire, according to a preset correspondence between a PD2DSS and a forwarding hop count, a PD2DSS corresponding to the current forwarding hop count; acquire, according to a preset correspondence between an SD2DSS and a synchronization source identifier, an SD2DSS corresponding to the determined synchronization source identifier; add the acquired PD2DSS and SD2DSS to the D2D synchronization signal; and use the D2D synchronization signal that carries the PD2DSS and the SD2DSS as the first D2D synchronization information.

With reference to the fifth possible implementation manner of the second aspect, in a seventh possible implementation manner, the message processing unit is specifically configured to: acquire, according to a preset correspondence between a PD2DSS and a forwarding hop count, a PD2DSS corresponding to the determined forwarding hop count; add the acquired PD2DSS to the D2D synchronization signal; use the D2D synchronization signal that carries the PD2DSS as the first-part D2D synchronization information of the first D2D synchronization information; and use indication information of the determined synchronization source identifier as the second-part D2D synchronization information that is sent through the PD2DSCH and that is of the first D2D synchronization information.

With reference to the fifth possible implementation manner of the second aspect, in an eighth possible implementation manner, the message processing unit is specifically configured to: acquire, according to a preset correspondence between an SD2DSS and a synchronization source identifier, an SD2DSS corresponding to the determined synchronization source identifier; and add the acquired SD2DSS and a preset PD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information, where PD2DSSes preset for all synchronization sources are the same in D2D communication.

With reference to the fifth possible implementation manner of the second aspect, in a ninth possible implementation manner, the message processing unit is specifically configured to: acquire, according to a preset correspondence between an SD2DSS and a synchronization source identifier and between an SD2DSS and a forwarding hop count, an SD2DSS corresponding to the determined synchronization source identifier and forwarding hop count; and add the SD2DSS to the D2D synchronization signal, and use the D2D synchronization signal as the first D2D synchronization information.

With reference to the ninth possible implementation manner of the second aspect, in a tenth possible implementation manner, the preset correspondence between an SD2DSS and a synchronization source identifier and between an SD2DSS and a forwarding hop count includes: the preset correspondence between an SD2DSS and a forwarding hop count satisfying $N_k = \text{mod}(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \text{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

With reference to the fifth possible implementation manner of the second aspect, in an eleventh possible implementation manner, the message processing unit is specifically configured to: acquire, according to a preset correspondence between a synchronization source identifier and a combination of a PD2DSS and an SD2DSS, a combination of a PD2DSS and an SD2DSS that corresponds to the determined synchronization source identifier; and add the acquired combination of a PD2DSS and an SD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information.

With reference to the eleventh possible implementation manner of the second aspect, in a twelfth possible implementation manner, the preset correspondence between a synchronization source identifier and a combination of a PD2DSS and an SD2DSS includes: the preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s - 1)$, $0 \leq N_{ID}^{(2)} \leq (N_s - 1)$, $M_s$ represents a maximum quantity of PD2DSSes, and $N_s$ represents a maximum quantity of SD2DSSes.

With reference to the fifth possible implementation manner of the second aspect, in a thirteenth possible implementation manner, the message processing unit is specifically configured to: acquire, according to a preset correspondence between a synchronization source identifier and a PD2DSS-SD2DSS group, a PD2DSS-SD2DSS group corresponding to the determined synchronization source identifier, where each PD2DSS-SD2DSS group includes multiple combinations of a PD2DSS and an SD2DSS; acquire, according to a preset correspondence between an SD2DSS and a forwarding hop count, an SD2DSS corresponding to the determined forwarding hop count; and determine a combination of a PD2DSS and an SD2DSS that includes the acquired SD2DSS and that is in the acquired PD2DSS-SD2DSS group; and add the determined combination of a PD2DSS and an SD2DSS to the D2D synchronization signal; and use the D2D synchronization signal as the first D2D synchronization information.

With reference to the thirteenth possible implementation manner of the second aspect, in a fourteenth possible implementation manner, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

With reference to the fourteenth possible implementation manner of the second aspect, in a fifteenth possible implementation manner, the preset correspondence between a synchronization source identifier and a PD2DSS-SD2DSS group includes: a preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s - 1)$, $0 \leq N_{ID}^{(2)} \leq (N_s - 1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

With reference to any one of the third possible implementation manner to the fifteenth possible implementation manner of the second aspect, in a sixteenth possible implementation manner, the message processing unit is further configured to: convert, according to a set cycle, the synchronization source identifier carried in the first D2D synchronization information.

With reference to the sixteenth possible implementation manner of the second aspect, in a seventeenth possible implementation manner, the message processing unit is further configured to: convert, according to the set cycle, the SD2DSS carried in the D2D synchronization signal; or convert, according to the set cycle, the PD2DSS carried in the D2D synchronization signal; or convert, according to the set cycle, the PD2DSS carried in the D2D synchronization signal, and change, according to the set cycle, the SD2DSS carried in the D2D synchronization signal.

With reference to the seventeenth possible implementation manner of the second aspect, in an eighteenth possible implementation manner, the message processing unit is further configured to: in the $m^{th}$ set cycle, a sequence number of the PD2DSS/SD2DSS is $N_{ID}^{(2)}(m) = \text{mod}(\text{IMSI} + \text{Nframe}(m)N_s)$, where $N_{ID}^{(2)}$ represents a sequence number of the PD2DSS/SD2DSS or a synchronization source identifier, IMSI is an international mobile subscriber identity, Nframe(m) represents a number of a radio frame on which the device is located when the PD2DSS/SD2DSS carried in the D2D synchronization signal is changed for the $m^{th}$ time, and $N_s$ represents a maximum quantity of PD2DSSes/SD2DSSes or a maximum quantity of identifiable synchronization sources.

With reference to the seventeenth possible implementation manner of the second aspect, in a nineteenth possible implementation manner, the message processing unit is further configured to: in the $m^{th}$ set cycle, a sequence number of the PD2DSS/SD2DSS is $N_{ID}^{(2)}(m)=\text{mod}(\text{IMSI} \times (N_{ID}^{(2)}(m-1)+a), N_s)$, where when m is equal to 0, $N_{ID}^{(2)}(0)=\text{mod}(\text{IMSI}+\text{Nframe}(0), N_s)$, $N_{ID}^{(2)}$ represents a sequence number of the PD2DSS/SD2DSS or a synchronization source identifier, IMSI is an international mobile subscriber identity, $N_s$ represents a maximum quantity of PD2DSSes/SD2DSSes or a maximum quantity of identifiable synchronization sources, a represents a non-zero integer, and Nframe (0) represents a number of a radio frame on which the device is located when the D2D synchronization signal is sent for the first time.

With reference to any one of the third possible implementation manner to the fifteenth possible implementation manner of the second aspect, in a twentieth possible implementation manner, the sending unit is specifically configured to: when the receiving unit receives a D2D synchronization signal by using any one of radio frames used for sending a D2D synchronization signal, transmit a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

With reference to any one of the third possible implementation manner to the fifteenth possible implementation manner of the second aspect, in a twenty-first possible implementation manner, the sending unit is specifically configured to: when the receiving unit receives a D2D synchronization signal by using any resource that is used for a D2D synchronization signal and that is included in a radio frame used for sending a D2D synchronization signal, send a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

With reference to any one of the third possible implementation manner to the fifteenth possible implementation manner of the second aspect, in a twenty-second possible implementation manner, the sending unit is specifically configured to: after determining that a D2D synchronization signal needs to be sent, send only the D2D synchronization signal within a set quantity of transmission cycles; and the receiving unit does not receive any D2D synchronization signal within the set quantity of transmission cycles.

According to a third aspect, a method for sending synchronization information in device-to-device D2D communication is provided. The method includes determining, by a first device in D2D communication, a synchronization source identifier and a forwarding hop count; and encapsulating the determined synchronization source identifier and forwarding hop count into first D2D synchronization information. The method also includes sending the first D2D synchronization information, where a second device in D2D communication receives the first D2D synchronization information; synchronizes with a synchronization source corresponding to the synchronization source identifier in the first D2D synchronization information; and updates the forwarding hop count in the first D2D synchronization information when determining that the forwarding hop count in the first D2D synchronization information is less than a set threshold and sends second D2D synchronization information obtained after update of the forwarding hop count.

With reference to the third aspect, in a first possible implementation manner, the first D2D synchronization information further includes a synchronization source type. Before the sending the first D2D synchronization information, the method includes: detecting, by the first device, a downlink synchronization signal sent by a network; and determining that the downlink synchronization signal is not detected; or detecting, by the first device, a downlink synchronization signal sent by a network; after determining that the downlink synchronization signal is detected, receiving third D2D synchronization information sent by another device; and determining, according to a synchronization source type in the third D2D synchronization information, that a synchronization source is not a network device.

With reference to the first possible implementation manner of the third aspect, in a second possible implementation manner, a time-frequency occupied by the first D2D synchronization information is different from a time-frequency resource occupied by the downlink synchronization signal sent by the network.

With reference to the third aspect, in a third possible implementation manner, the sending the first D2D synchronization information includes: sending a D2D synchronization signal, where the D2D synchronization signal carries the first D2D synchronization information; or sending a D2D synchronization signal, where the D2D synchronization signal carries first-part D2D synchronization information of the first D2D synchronization information; and sending second-part D2D synchronization information of the first D2D synchronization information through a physical D2D synchronization channel PD2DSCH, where the first-part D2D synchronization information and the second-part D2D synchronization information are combined into the first D2D synchronization information.

With reference to the third possible implementation manner of the third aspect, in a fourth possible implementation manner, a transmission cycle of the D2D synchronization signal and a transmission cycle of the PD2DSCH are different.

With reference to the fourth possible implementation manner of the third aspect, in a fifth possible implementation manner, the D2D synchronization signal includes a primary D2D synchronization signal PD2DSS and/or a secondary D2D synchronization signal SD2DSS.

With reference to the fifth possible implementation manner of the third aspect, in a sixth possible implementation manner, the encapsulating the determined synchronization source identifier and forwarding hop count into first D2D synchronization information includes: acquiring, according to a preset correspondence between a PD2DSS and a forwarding hop count, a PD2DSS corresponding to the determined forwarding hop count; acquiring, according to a preset correspondence between an SD2DSS and a synchronization source identifier, an SD2DSS corresponding to the determined synchronization source identifier; adding the acquired PD2DSS and SD2DSS to the D2D synchronization signal; and using the D2D synchronization signal as the first D2D synchronization information.

With reference to the fifth possible implementation manner of the third aspect, in a seventh possible implementation manner, the encapsulating the determined synchronization source identifier and forwarding hop count into first D2D synchronization information includes: acquiring, according to a preset correspondence between a PD2DSS and a forwarding hop count, a PD2DSS corresponding to the determined forwarding hop count; adding the acquired PD2DSS to the D2D synchronization signal; using the D2D synchronization signal as the first-part D2D synchronization information of the first D2D synchronization information; and using indication information of the determined synchronization source identifier as the second-part D2D synchronization information that is sent based on the PD2DSCH and that is of the first D2D synchronization information.

With reference to the fifth possible implementation manner of the third aspect, in an eighth possible implementation manner, the encapsulating the determined synchronization source identifier and forwarding hop count into first D2D synchronization information includes: acquiring, according to a preset correspondence between an SD2DSS and a synchronization source identifier, an SD2DSS corresponding to the determined synchronization source identifier; and adding the acquired SD2DSS and a preset PD2DSS to the D2D synchronization signal; using the D2D synchronization signal as the first-part D2D synchronization information of the first D2D synchronization information; and using indication information of the determined forwarding hop count as the second-part D2D synchronization information that is sent through the PD2DSCH and that is of the first D2D synchronization information, where PD2DSSes preset for all synchronization sources are the same in D2D communication.

With reference to the fifth possible implementation manner of the third aspect, in a ninth possible implementation manner, the encapsulating the determined synchronization source identifier and forwarding hop count into first D2D synchronization information includes: acquiring, according to a preset correspondence between an SD2DSS and a synchronization source identifier and between an SD2DSS and a forwarding hop count, an SD2DSS corresponding to the determined synchronization source identifier and forwarding hop count; and adding the SD2DSS to the D2D synchronization signal, and using the D2D synchronization signal as the first D2D synchronization information.

With reference to the ninth possible implementation manner of the third aspect, in a tenth possible implementation manner, the preset correspondence between an SD2DSS and a synchronization source identifier and between an SD2DSS and a forwarding hop count includes: the preset correspondence between an SD2DSS and a forwarding hop count satisfying $N_k = \mathrm{mod}(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

With reference to the fifth possible implementation manner of the third aspect, in an eleventh possible implementation manner, the encapsulating the determined synchronization source identifier and forwarding hop count into first D2D synchronization information includes: acquiring, according to a preset correspondence between a synchronization source identifier and a combination of a PD2DSS and an SD2DSS, a combination of a PD2DSS and an SD2DSS that corresponds to the determined synchronization source identifier; and adding the acquired combination of a PD2DSS and an SD2DSS to the D2D synchronization signal; using the D2D synchronization signal as the first-part D2D synchronization information of the first D2D synchronization information; and using indication information of the determined forwarding hop count as the second-part D2D synchronization information that is sent through the PD2DSCH and that is of the first D2D synchronization information.

With reference to the eleventh possible implementation manner of the third aspect, in a twelfth possible implementation manner, the preset correspondence between a synchronization source identifier and a combination of a PD2DSS and an SD2DSS includes: the preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ represents a maximum quantity of SD2DSSes.

With reference to the fifth possible implementation manner of the third aspect, in a thirteenth possible implementation manner, the encapsulating the determined synchronization source identifier and forwarding hop count into first D2D synchronization information includes: acquiring, according to a preset correspondence between a synchronization source identifier and a PD2DSS-SD2DSS group, a PD2DSS-SD2DSS group corresponding to the determined synchronization source identifier, where each PD2DSS-SD2DSS group includes multiple combinations of a PD2DSS and an SD2DSS; acquiring, according to a preset correspondence between an SD2DSS and a forwarding hop count, an SD2DSS corresponding to the determined forwarding hop count; and determining a combination of a PD2DSS and an SD2DSS that includes the acquired SD2DSS and that is in the acquired PD2DSS-SD2DSS group; and adding the determined combination of a PD2DSS and an SD2DSS to the D2D synchronization signal; and using the D2D synchronization signal as the first D2D synchronization information.

With reference to the thirteenth possible implementation manner of the third aspect, in a fourteenth possible implementation manner, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

With reference to the fourteenth possible implementation manner of the third aspect, in a fifteenth possible implementation manner, the preset correspondence between a synchronization source identifier and a PD2DSS-SD2DSS group includes: a preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

With reference to any one of the fifth possible implementation manner to the fifteenth possible implementation manner of the third aspect, in a sixteenth possible implementation manner, the determining a synchronization source identifier includes: converting, according to a set cycle, the synchronization source identifier carried in the first D2D synchronization information.

With reference to the sixteenth possible implementation manner of the third aspect, in a seventeenth possible implementation manner, the converting, according to a set cycle, the synchronization source identifier carried in the first D2D synchronization information includes: converting, according to the set cycle, the SD2DSS carried in the D2D synchronization signal; or converting, according to the set cycle, the PD2DSS carried in the D2D synchronization signal; or converting, according to the set cycle, the PD2DSS carried in the D2D synchronization signal, and changing, according to the set cycle, the SD2DSS carried in the D2D synchronization signal.

With reference to the seventeenth possible implementation manner of the third aspect, in an eighteenth possible implementation manner, the converting, according to the set cycle, the PD2DSS/SD2DSS carried in the D2D synchronization signal includes: in the $m^{th}$ set cycle, a sequence number of the PD2DSS/SD2DSS is $N_{ID}^{(2)}(m)=\mathrm{mod}(\mathrm{IMSI}+\mathrm{Nframe}(m),\mathrm{Ns})$, where $N_{ID}^{(2)}$ represents a sequence number of the PD2DSS/SD2DSS or a synchronization source identifier, IMSI is an international mobile subscriber identity, Nframe(m) represents a number of a radio frame on which the device is located when the PD2DSS/SD2DSS carried in the D2D synchronization signal is changed for the $m^{th}$ time, and $N_s$ represents a maximum quantity of PD2DSSes/SD2DSSes or a maximum quantity of identifiable synchronization sources.

With reference to the seventeenth possible implementation manner of the third aspect, in a nineteenth possible implementation manner, the converting, according to the set cycle, the PD2DSS/SD2DSS carried in the D2D synchronization signal includes: in the $m^{th}$ set cycle, a sequence number of the PD2DSS/SD2DSS is $N_{ID}^{(2)}(m)=\mathrm{mod}(\mathrm{IMSI}\times(N_{ID}^{(2)}(m-1)+a),\mathrm{Ns})$, where when m is equal to 0, $N_{ID}^{(2)}(0)=\mathrm{mod}(\mathrm{IMSI}+\mathrm{Nframe}(0),\mathrm{Ns}$, $N_{ID}^{(2)}$ represents a sequence number of the PD2DSS/SD2DSS or a synchronization source identifier, IMSI is an international mobile subscriber identity, $N_s$ represents a maximum quantity of PD2DSSes/SD2DSSes or a maximum quantity of identifiable synchronization sources, a represents a non-zero integer, and Nframe(0) represents a number of a radio frame on which the first device is located when the D2D synchronization signal is sent for the first time.

With reference to any one of the fifth possible implementation manner to the fifteenth possible implementation manner of the third aspect, in a twentieth possible implementation manner, the sending the first D2D synchronization information includes: when receiving a D2D synchronization signal by using any one of radio frames used for sending a D2D synchronization signal, transmitting a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

With reference to any one of the fifth possible implementation manner to the fifteenth possible implementation manner of the third aspect, in a twenty-first possible implementation manner, the sending the first D2D synchronization information includes: when receiving a D2D synchronization signal by using any resource that is used for a D2D synchronization signal and that is included in a radio frame used for sending a D2D synchronization signal, sending a D2D synchronization signal by using another resource that is used for a D2D synchronization signal and that is included in the radio frame, where one or more radio frames used for sending a D2D synchronization signal are configured for each transmission cycle, and in each radio frame used for sending a D2D synchronization signal, two or more resources used for a D2D synchronization signal are configured.

With reference to any one of the fifth possible implementation manner to the fifteenth possible implementation manner of the third aspect, in a twenty-second possible implementation manner, the sending the first D2D synchronization information includes: after determining that a D2D synchronization signal needs to be sent, sending, by the first device, only the D2D synchronization signal within a set quantity of transmission cycles, and skipping receiving any D2D synchronization signal within the set quantity of transmission cycles.

According to a fourth aspect, a device synchronization method in device-to-device D2D communication is provided. The method includes receiving, by a second device in D2D communication, first D2D synchronization information sent by a first device, where the first D2D synchronization information includes a synchronization source identifier and a forwarding hop count. The method also includes synchronizing with a synchronization source corresponding to the synchronization source identifier in the first D2D synchronization information, and updating the forwarding hop count in the first D2D synchronization information when determining that the forwarding hop count in the first D2D synchronization information is less than a set threshold, so as to obtain second D2D synchronization information. The method also includes sending the second D2D synchronization information.

With reference to the fourth aspect, in a first possible implementation manner, the first D2D synchronization information is carried in a D2D synchronization signal sent by the first device; or the first D2D synchronization information includes first-part D2D synchronization information and second-part D2D synchronization information, where the first-part D2D synchronization information is carried in a D2D synchronization signal sent by the first device, and the second-part D2D synchronization information is sent by the first device through a physical D2D synchronization channel PD2DSCH.

With reference to the first possible implementation manner of the fourth aspect, in a second possible implementation manner, a transmission cycle of the D2D synchronization signal and a transmission cycle of the PD2DSCH are different.

With reference to the first possible implementation manner of the fourth aspect, in a third possible implementation manner, the D2D synchronization signal includes a primary D2D synchronization signal PD2DSS and/or a secondary D2D synchronization signal SD2DSS.

With reference to the third possible implementation manner of the fourth aspect, in a fourth possible implementation manner, the synchronizing with a synchronization source corresponding to the synchronization source identifier in the first D2D synchronization information includes: determining, according to a preset correspondence between an SD2DSS and a synchronization source identifier, a synchronization source identifier that is corresponding to the SD2DSS and that is carried in the received D2D synchronization signal; and synchronizing with a synchronization source corresponding to the determined synchronization source identifier; and the updating the forwarding hop count in the first D2D synchronization information when determining that the forwarding hop count in the first D2D synchronization information is less than a set threshold, so as to obtain second D2D synchronization information includes: determining, according to a preset correspondence between a PD2DSS and a forwarding hop count, a forwarding hop count that is corresponding to the PD2DSS and that is carried in the received D2D synchronization signal; and when the determined forwarding hop count is less than the set threshold, using a sum of the determined forwarding hop count and a set value as a current forwarding hop count; determining, according to the preset correspondence between a PD2DSS and a forwarding hop count, a PD2DSS corresponding to the current forwarding hop count; and after the PD2DSS in the received D2D synchronization signal is replaced with the determined PD2DSS, using a D2D synchronization signal with the replaced PD2DSS as the second D2D synchronization information.

With reference to the third possible implementation manner of the fourth aspect, in a fifth possible implementation manner, the synchronizing with a synchronization source corresponding to the synchronization source identifier in the first D2D synchronization information includes: receiving, based on the PD2DSCH, indication information of the synchronization source identifier; determining the synchronization source identifier according to the indication information of the synchronization source identifier; and synchronizing with a synchronization source corresponding to the determined synchronization source identifier. The updating the forwarding hop count in the first D2D synchronization information when determining that the forwarding hop count in the first D2D synchronization information is less than a set threshold, so as to obtain second D2D synchronization information includes: determining, according to a preset correspondence between a PD2DSS and a forwarding hop count, a forwarding hop count that is corresponding to the PD2DSS and that is carried in the received D2D synchronization signal; and when the determined forwarding hop count is less than the set threshold, using a sum of the determined forwarding hop count and a set value as a current forwarding hop count; determining, according to the preset correspondence between a PD2DSS and a forwarding hop count, a PD2DSS corresponding to the current forwarding hop count; replacing the PD2DSS in the received D2D synchronization signal with the determined PD2DSS; and using a D2D synchronization signal obtained after PD2DSS replacement as first-part D2D synchronization information of the second D2D synchronization information, and using the indication information of the synchronization source identifier as second-part D2D synchronization information that is sent through the PD2DSCH and that is of the second D2D synchronization information, to obtain the second D2D synchronization information.

With reference to the third possible implementation manner of the fourth aspect, in a sixth possible implementation manner, the synchronizing with a synchronization source corresponding to the synchronization source identifier in the first D2D synchronization information includes: determining, according to a preset correspondence between an SD2DSS and a synchronization source identifier, a synchronization source identifier that is corresponding to the SD2DSS and that is carried in the received D2D synchronization signal; and synchronizing with a synchronization source corresponding to the determined synchronization source identifier. The updating the forwarding hop count in the first D2D synchronization information when determining that the forwarding hop count in the first D2D synchronization information is less than a set threshold, so as to obtain second D2D synchronization information includes: receiving, based on the PD2DSCH, indication information of the forwarding hop count; determining the forwarding hop count according to the indication information of the forwarding hop count; when the determined forwarding hop count is less than the set threshold, using a sum of the determined forwarding hop count and a set value as a current forwarding hop count; and using the synchronization signal that carries the SD2DSS as first-part D2D synchronization information of the second D2D synchronization information, and using indication information of the current forwarding hop count as second-part D2D synchronization information that is sent through the PD2DSCH and that is of the second D2D synchronization information, to obtain the second D2D synchronization information.

With reference to the third possible implementation manner of the fourth aspect, in a seventh possible implementation manner, the synchronizing with a synchronization source corresponding to the synchronization source identifier in the first D2D synchronization information, and updating the forwarding hop count in the first D2D synchronization information when determining that the forwarding hop count in the first D2D synchronization information is less than a set threshold, so as to obtain second D2D synchronization information includes: determining, according to a preset correspondence between an SD2DSS and a synchronization source identifier and between an SD2DSS and a forwarding hop count, a synchronization source identifier and a forwarding hop count that are corresponding to the SD2DSS carried in the received D2D synchronization signal; and synchronizing with a synchronization source corresponding to the determined synchronization source identifier; and when the determined forwarding hop count is less than the set threshold, using a sum of the determined forwarding hop count and a set value as a current forwarding hop count; determining, according to the preset correspondence between an SD2DSS and a synchronization source identifier and between an SD2DSS and a forwarding hop count, an SD2DSS corresponding to the synchronization source identifier and the current forwarding hop count; replacing the SD2DSS in the D2D synchronization signal with the determined SD2DSS; and using a D2D synchronization signal obtained after SD2DSS replacement as the second D2D synchronization information.

With reference to the seventh possible implementation manner of the fourth aspect, in an eighth possible implementation manner, the preset correspondence between an SD2DSS and a synchronization source identifier and between an SD2DSS and a forwarding hop count includes: the preset correspondence between an SD2DSS and a forwarding hop count satisfying $N_k = \mathrm{mod}(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

With reference to the third possible implementation manner of the fourth aspect, in a ninth possible implementation manner, the synchronizing with a synchronization source corresponding to the synchronization source identifier in the first D2D synchronization information includes: determining, according to a preset correspondence between a synchronization source identifier and a combination of a PD2DSS and an SD2DSS, a synchronization source identifier that is corresponding to a combination of the PD2DSS and the SD2DSS and the SD2SS carried in the received D2D synchronization signal; and synchronizing with a synchronization source corresponding to the determined synchronization source identifier; and the updating the forwarding hop count in the first D2D synchronization information when determining that the forwarding hop count in the first D2D synchronization information is less than a set threshold, so as to obtain second D2D synchronization information includes: receiving, based on the PD2DSCH, indication information of the forwarding hop count; determining the forwarding hop count according to the indication information of the forwarding hop count; when the determined forwarding hop count is less than the set threshold, using a sum of the determined forwarding hop count and a set value as a current forwarding hop count; and using the D2D synchronization signal as first-part D2D synchronization information of the second D2D synchronization information, and using indication information of the current forwarding hop count as second-part D2D synchronization information that is sent through the PD2DSCH and that is of the second D2D synchronization information, to obtain the second D2D synchronization information.

With reference to the ninth possible implementation manner of the fourth aspect, in a tenth possible implementation manner, the preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ represents a maximum quantity of SD2DSSes.

With reference to the third possible implementation manner of the fourth aspect, in an eleventh possible implementation manner, the synchronizing with a synchronization source corresponding to the synchronization source identifier in the first D2D synchronization information includes: determining, according to a preset correspondence between a synchronization source identifier and a PD2DSS-SD2DSS group, a synchronization source identifier that is corresponding to a PD2DSS-SD2DSS group to which a combination of the PD2DSS and the SD2DSS carried in the received D2D synchronization signal belongs; and synchronizing with a synchronization source corresponding to the determined synchronization source identifier; and the updating the forwarding hop count in the first D2D synchronization information when determining that the forwarding hop count in the first D2D synchronization information is less than a set threshold, so as to obtain second D2D synchronization information includes: determining, according to a preset correspondence between an SD2DSS and a forwarding hop count, a forwarding hop count that is corresponding to the SD2DSS in the combination of the PD2DSS and the SD2DSS that are carried in the received D2D synchronization signal; when the determined forwarding hop count is less than the set threshold, using a sum of the determined forwarding hop count and a set value as a current forwarding hop count; acquiring, according to the preset correspondence between an SD2DSS and a forwarding hop count, an SD2DSS corresponding to the current forwarding hop count; determining a combination of a PD2DSS and an SD2DSS that is corresponding to the acquired SD2DSS and that is included in the PD2DSS-SD2DSS group to which the combination of the PD2DSS and the SD2DSS carried in the received D2D synchronization signal belongs; replacing the combination of the PD2DSS and the SD2DSS in the D2D synchronization signal with the determined combination of the PD2DSS and the SD2DSS; and using a D2D synchronization signal obtained after replacement of the combination of the PD2DSS and the SD2DSS as the second D2D synchronization information.

With reference to the eleventh possible implementation manner of the fourth aspect, in a twelfth possible implementation manner, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

With reference to the twelfth possible implementation manner of the fourth aspect, in a thirteenth possible implementation manner, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

With reference to any one of the fourth aspect to the thirteenth possible implementation manner of the fourth aspect, in a fourteenth possible implementation manner, the receiving first D2D synchronization information, and synchronizing with a synchronization source corresponding to the synchronization source identifier in the first D2D synchronization information includes: receiving the first D2D synchronization information; when determining that more than one piece of first D2D synchronization information is received, separately acquiring forwarding hop counts carried in the received pieces of first D2D synchronization information; determining a minimum value of the acquired forwarding hop counts; and when determining that the minimum value is less than the set threshold, synchronizing with a synchronization source corresponding to a synchronization source identifier in first D2D synchronization information corresponding to the minimum value.

With reference to the fourteenth possible implementation manner of the fourth aspect, in a fifteenth possible implementation manner, the performing synchronization according to first D2D synchronization information corresponding to the minimum value includes: if the minimum value is corresponding to more than one piece of first D2D synchronization information, determining signal strengths of the pieces of first D2D synchronization information corresponding to the minimum value; and performing synchronization according to the first D2D synchronization information corresponding to a greatest value of the signal strengths.

With reference to any one of the fourth aspect to the thirteenth possible implementation manner of the fourth aspect, in a sixteenth possible implementation manner, the receiving first D2D synchronization information, and synchronizing with a synchronization source corresponding to the synchronization source identifier in the first D2D synchronization information includes: receiving the first D2D synchronization information; when determining that more than one piece of first D2D synchronization information is received, determining, according to synchronization source types carried in the first D2D synchronization signals, the first D2D synchronization information in which a synchronization source is a network; and performing synchronization according to the determined first D2D synchronization information.

With reference to the sixteenth possible implementation manner of the fourth aspect, in a seventeenth possible implementation manner, after the first D2D synchronization information in which the synchronization source is a network is determined, the method further includes: acquiring a forwarding hop count carried in the determined first D2D synchronization information in which the synchronization source is a network; and if determining that the forwarding hop count is less than the set threshold, performing synchronization according to the determined first D2D synchronization information in which the synchronization source is a network; or if determining that the forwarding hop count is not less than the set threshold, acquiring forwarding hop counts carried in the other pieces of first D2D synchronization information; determining a minimum value of the acquired forwarding hop counts; and when determining that the minimum value is less than the set threshold, synchronizing with a synchronization source indicated by a synchronization source identifier in the first D2D synchronization information corresponding to the minimum value.

With reference to the sixteenth possible implementation manner of the fourth aspect, in an eighteenth possible implementation manner, the determining the first D2D synchronization information in which a synchronization source is a network, and performing synchronization according to the determined first D2D synchronization information further includes: updating a greatest value of the forwarding hop counts, where a greatest value of the forwarding hop counts that is obtained after the update is greater than the greatest value of the forwarding hop counts that exists before the update; and when determining that the forwarding hop count in the first D2D synchronization information is less than the greatest value of the forwarding hop counts that is obtained after the update, updating the forwarding hop count in the first D2D synchronization information, to obtain the second D2D synchronization information; sending the second D2D synchronization information, and sending the greatest value of the forwarding hop counts that is obtained after the update.

With reference to any one of the first possible implementation manner of the fourth aspect to the thirteenth possible implementation manner of the fourth aspect, in a nineteenth possible implementation manner, the method further includes: when a D2D synchronization signal is received by using any one of radio frames used for sending a D2D synchronization signal, transmitting a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

With reference to any one of the first possible implementation manner of the fourth aspect to the thirteenth possible implementation manner of the fourth aspect, in a twentieth possible implementation manner, the method further includes: when a D2D synchronization signal is received by using any resource that is used for a D2D synchronization signal and that is included in a radio frame used for sending a D2D synchronization signal, sending a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

With reference to any one of the first possible implementation manner of the fourth aspect to the thirteenth possible implementation manner of the fourth aspect, in a twenty-first possible implementation manner, the method further includes: after the second device determines that a D2D synchronization signal needs to be sent, sending only the D2D synchronization signal within a set quantity of transmission cycles; and skipping receiving any D2D synchronization signal within the set quantity of transmission cycles.

Based on the foregoing technical solutions, in the embodiments, a device in D2D communication receives D2D synchronization information sent by another device, and synchronizes with a synchronization source corresponding to a synchronization source identifier carried in the D2D synchronization information, to implement synchronization between the device and the another device; and when determining that a forwarding hop count carried in the D2D synchronization information does not exceed a set threshold, updates the forwarding hop count in the D2D synchronization information, and sends updated D2D synchronization information, so that a device adjacent to the device can synchronize with the device, thereby implementing synchronization between devices in D2D communication. In addition, complexity of communication between devices may be effectively controlled by limiting a forwarding hop count.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

A core idea of implementing synchronization between devices in D2D communication in the embodiments is as follows. Some devices in D2D communication, serving as synchronization sources, encapsulate and send D2D synchronization information; another device adjacent to the devices that serve as the synchronization sources receives the D2D synchronization information, synchronizes with the synchronization sources indicated by the D2D synchronization information, and when a forwarding hop count in the D2D synchronization information indicating the synchronization sources does not reach a set threshold, forwards, to another adjacent device, the D2D synchronization information indicating the synchronization sources, to implement synchronization between devices.

The following embodiments are described by using an example in which a primary D2D synchronization sequence (PD2DSS) carried in a synchronization signal is generated using a same generation method as that of a primary synchronization sequence (PSS) in a synchronization channel in an LTE network, and a secondary D2D synchronization sequence (SD2DSS) is generated using a same generation method as that of a secondary synchronization sequence (SSS) in the synchronization channel in the LTE network. In the embodiments, the PSS may be used as the PD2DSS and the SSS may be used as the SD2DSS, or the generation methods of the PD2DSS and the SD2DSS may be redefined, or the PD2DSS and the SD2DSS may be generated in another existing sequence generation manner. In short, the protection scope of the present invention is not limited by generation manners of the PD2DSS and the SD2DSS.

Figure 1:
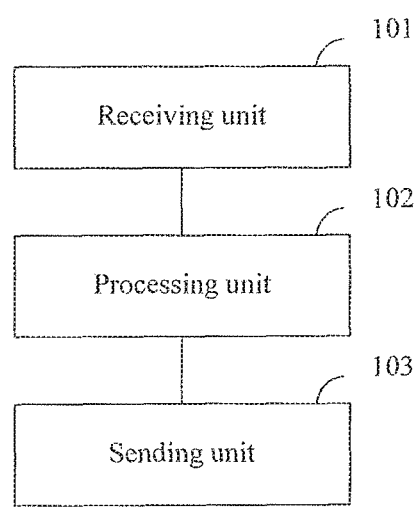
FIG. 1 is a schematic structural diagram of a device in D2D communication according to Embodiment 1.

In Embodiment 1, as shown in FIG. 1, a device in D2D communication is provided. The device includes a receiving unit 101, a processing unit 102, and a sending unit 103.

The receiving unit 101 receives first D2D synchronization information sent by a first device in D2D communication, where the first D2D synchronization information includes a synchronization source identifier and a forwarding hop count.

The processing unit 102 determines a synchronization source according to the synchronization source identifier in the first D2D synchronization information received by the receiving unit 101; synchronizes with the synchronization source; and updates the forwarding hop count carried in the first D2D synchronization information when determining that the forwarding hop count in the first D2D synchronization information is less than a set threshold, so as to obtain second D2D synchronization information.

The sending unit 103 sends the second D2D synchronization information to each adjacent device.

Preferably, the first D2D synchronization information is carried in a D2D synchronization signal sent by the first device; or the first D2D synchronization information includes first-part D2D synchronization information and second-part D2D synchronization information, where the first-part D2D synchronization information is carried in a D2D synchronization signal sent by the first device, and the second-part D2D synchronization information is sent by the first device through a physical D2D synchronization channel (PD2DSCH).

In specific implementation, a transmission cycle of the D2D synchronization signal and a transmission cycle of the PD2DSCH may be the same or may be different.

The D2D synchronization signal may include a primary D2D synchronization signal (PD2DSS) or a secondary D2D synchronization signal (SD2DSS), or may include both a PD2DSS and an SD2DSS.

In this embodiment, there may be the following several optional implementation manners according to different manners in which the first D2D synchronization information carries the synchronization source identifier and the forwarding hop count.

Manner 1: The processing unit is specifically configured to determine, according to a preset correspondence between an SD2DSS and a synchronization source identifier, a synchronization source identifier that is corresponding to the SD2DSS, carried in the D2D synchronization signal, and received by the receiving unit; and synchronize with a synchronization source corresponding to the determined synchronization source identifier. The processing unit is also configured to determine, according to a preset correspondence between a PD2DSS and a forwarding hop count, a forwarding hop count that is corresponding to the PD2DSS, carried in the D2D synchronization signal, and received by the receiving unit. The processing unit is also configured to, when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; and after the PD2DSS in the received D2D synchronization signal is replaced with the determined PD2DSS, use a D2D synchronization signal with the replaced PD2DSS as the second D2D synchronization information.

Manner 2: The processing unit is specifically configured to determine a synchronization source identifier according to indication information, received by the receiving unit based on the PD2DSCH, of the synchronization source identifier; and synchronize with a synchronization source corresponding to the determined synchronization source identifier. The processing unit is also configured to determine, according to a preset correspondence between a PD2DSS and a forwarding hop count, a forwarding hop count that is corresponding to the PD2DSS, carried in the D2D synchronization signal, and received by the receiving unit. The processing unit is also configured to, when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; and after the PD2DSS in the received D2D synchronization signal is replaced with the determined PD2DSS, use a D2D synchronization signal obtained after PD2DSS replacement as first-part D2D synchronization information of the second D2D synchronization information, and use the indication information of the synchronization source identifier as second-part D2D synchronization information that is sent through the PD2DSCH and that is of the second D2D synchronization information, to obtain the second D2D synchronization information.

Manner 3: The processing unit is specifically configured to: determine, according to a preset correspondence between an SD2DSS and a synchronization source identifier, a synchronization source identifier that is corresponding to the SD2DSS, carried in the D2D synchronization signal, and received by the receiving unit; and synchronize with a synchronization source corresponding to the determined synchronization source identifier; and determine a forwarding hop count according to indication information, received by the receiving unit based on the PD2DSCH, of the forwarding hop count; when the determined forwarding hop count is less than the set threshold, use a sum of the determined forwarding hop count and a set value as a current forwarding hop count; and use the D2D synchronization signal that carries the SD2DSS as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information.

The sending unit is specifically configured to: send the first-part D2D synchronization information of the second D2D synchronization information, and send, based on the PD2DSCH, the second-part D2D synchronization information of the second D2D synchronization information.

Manner 4: The processing unit is specifically configured to: determine, according to a preset correspondence between an SD2DSS and a synchronization source identifier and between an SD2DSS and a forwarding hop count, a synchronization source identifier and a forwarding hop count that are corresponding to the SD2DSS, carried in the D2D synchronization signal, and received by the receiving unit; and synchronize with a synchronization source corresponding to the determined synchronization source identifier. The processing unit is also configured to, when the determined forwarding hop count is less than the set threshold, use a sum of the determined forwarding hop count and a set value as a current forwarding hop count; determine, according to the preset correspondence between an SD2DSS and a synchronization source identifier and between an SD2DSS and a forwarding hop count, an SD2DSS corresponding to the synchronization source identifier and the current forwarding hop count; replace the SD2DSS in the D2D synchronization signal with the determined SD2DSS; and use a D2D synchronization signal obtained after SD2DSS replacement as the second D2D synchronization information.

The preset correspondence between an SD2DSS and a synchronization source identifier and between an SD2DSS and a forwarding hop count includes: the preset correspondence between an SD2DSS and a forwarding hop count satisfying $N_k=\mathrm{mod}(N_{ID}^{(2)},K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID}=\mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

Manner 5: The processing unit is specifically configured to: determine, according to a preset correspondence between a synchronization source identifier and a combination of a PD2DSS and an SD2DSS, a synchronization source identifier that is corresponding to a combination of the PD2DSS and the SD2DSS, carried in the D2D synchronization signal, and received by the receiving unit; and synchronize with a synchronization source corresponding to the determined synchronization source identifier. The processing unit is also configured to, determine a forwarding hop count according to indication information, received by the receiving unit based on the PD2DSCH, of the forwarding hop count; when the determined forwarding hop count is less than the set threshold, use a sum of the determined forwarding hop count and a set value as a current forwarding hop count; and use the D2D synchronization signal as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information.

The sending unit is specifically configured to: send the first-part D2D synchronization information of the second D2D synchronization information, and send, based on the PD2DSCH, the second-part D2D synchronization information of the second D2D synchronization information.

The preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \le N_{ID}^{(1)} \le (M_s-1)$, $0 \le N_{ID}^{(2)} \le (N_s-1)$, $M_s$ represents a maximum quantity of PD2DSSes, and $N_s$ represents a maximum quantity of SD2DSSes.

Manner 6: The processing unit is specifically configured to: determine, according to a preset correspondence between a synchronization source identifier and a PD2DSS-SD2DSS group, a synchronization source identifier that is corresponding to a PD2DSS-SD2DSS group to which a combination of the PD2DSS and the SD2DSS, carried in the D2D synchronization signal, and received by the receiving unit belongs; and synchronize with a synchronization source corresponding to the determined synchronization source identifier; and determine, according to a preset correspondence between an SD2DSS and a forwarding hop count, a forwarding hop count that is corresponding to the SD2DSS in the combination of the PD2DSS and the SD2DSS, carried in the D2D synchronization, and received by the receiving unit; when the determined forwarding hop count is less than the set threshold, use a sum of the determined forwarding hop count and a set value as a current forwarding hop count; acquire, according to the preset correspondence between an SD2DSS and a forwarding hop count, an SD2DSS corresponding to the current forwarding hop count; determine a combination of a PD2DSS and an SD2DSS that is corresponding to the acquired SD2DSS and that is included in the PD2DSS-SD2DSS group to which the combination of the PD2DSS and the SD2DSS carried in the received D2D synchronization signal belongs; replace the combination of the PD2DSS and the SD2DSS in the D2D synchronization signal with the determined combination of the PD2DSS and the SD2DSS; and use a D2D synchronization signal obtained after replacement of the combination of the PD2DSS and the SD2DSS as the second D2D synchronization information.

A number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

In a specific embodiment, a device in D2D communication may simultaneously receive multiple pieces of first D2D synchronization information. In this case, one piece of the first D2D synchronization information needs to be selected according to a preset selection rule and synchronization is performed.

The first D2D synchronization information further carries a synchronization source type. In this embodiment, the synchronization source type may be a network, a device, a global positioning system (GPS), or the like.

When multiple pieces of first D2D synchronization information are received, there are the following two processing manners according to synchronization source types carried in the pieces of first D2D synchronization information:

Manner 1: Multiple pieces of first D2D synchronization information are received, and it is determined, according to synchronization source types carried in the multiple pieces of first D2D synchronization information, that the multiple pieces of first D2D synchronization information are of a same synchronization source type. For example, it is determined, according to the synchronization source types, that the pieces of first D2D synchronization information come from different devices in D2D communication, or it is determined, according to the synchronization source types, that the pieces of first D2D synchronization information come from a network side.

Preferably, performing selection according to forwarding hop counts carried in the first D2D synchronization information includes: when determining that the receiving unit receives more than one piece of first D2D synchronization information, separately acquiring, by the processing unit, forwarding hop counts carried in the received pieces of first D2D synchronization information; determining a minimum value of the acquired forwarding hop counts; and when determining that the minimum value is less than the set threshold, synchronizing with a synchronization source corresponding to a synchronization source identifier in first D2D synchronization information corresponding to the minimum value.

Further, when the minimum value is corresponding to more than one piece of first D2D synchronization information, the processing unit determines signal strengths of the pieces of first D2D synchronization information corresponding to the minimum value; and performs synchronization according to first D2D synchronization information corresponding to a greatest value of the signal strengths.

Similarly, in this specific embodiment, if determining that the forwarding hop counts carried in the pieces of first D2D synchronization information that are received by the receiving unit are the same and the forwarding hop counts are less than the set threshold, the processing unit determines signal strengths of the pieces of first D2D synchronization information, and performs synchronization according to first D2D synchronization information corresponding to a greatest value of the signal strengths.

Preferably, in this specific embodiment, after the forwarding hop counts carried in the pieces of first D2D synchronization information are acquired, if determining that the minimum value of the forwarding hop counts is not less than the set threshold, the processing unit discards all the first D2D synchronization information. Optionally, the receiving unit receives, within set duration, first D2D synchronization information sent by another device. If determining that the receiving unit has not received the first D2D synchronization information within the set duration, the processing unit generates the second D2D synchronization information by using the device as a synchronization source and an identifier of the device as a synchronization source identifier and by setting the current forwarding hop count to an initial value, and instructs the sending unit to send the second D2D synchronization information, so that the another adjacent device and the device are synchronized in time and frequency.

Manner 2: Multiple pieces of first D2D synchronization information are received, and it is determined, according to synchronization source types carried in the multiple pieces of first D2D synchronization information, that the multiple pieces of first D2D synchronization information are of different synchronization source types. For example, it is determined, according to the synchronization source types, that one piece of the first D2D synchronization information comes from a network side, or that the other pieces of the first D2D synchronization information come from different devices in D2D communication respectively.

Preferably, when determining that the receiving unit receives more than one piece of first D2D synchronization information, the processing unit determines, according to synchronization source types carried in the pieces of first D2D synchronization information, first D2D synchronization information in which a synchronization source is a network, and performs synchronization according to the determined first D2D synchronization information.

Preferably, after determining the first D2D synchronization information in which the synchronization source is a network, the processing unit acquires a forwarding hop count carried in the determined first D2D synchronization information in which the synchronization source is a network; and if determining that the forwarding hop count is less than the set threshold, performs synchronization according to the determined first D2D synchronization information in which the synchronization source is a network; or if determining that the forwarding hop count is not less than the set threshold, selects one piece of the first D2D synchronization information from the other pieces of the first D2D synchronization information in the foregoing first processing manner and performs synchronization.

The preset threshold is set in advance. In actual application, the preset threshold may be determined according to synchronization precision on a network side and a reduction value of synchronization precision caused by each time of forwarding (a forwarding hop count of one) between devices, that is, it is ensured that synchronization precision corresponding to the preset threshold is higher than a threshold, so as to ensure synchronization precision between devices in D2D communication, and also to avoid a reduction of stability caused when excessive devices synchronize with a same synchronization source.

Optionally, after any device in D2D communication receives the first D2D synchronization information in which the synchronization source type is a network, if the device has synchronized with another synchronization source type (for example, another device in D2D communication) before, the device turns to synchronize with the network. Preferably, after the device turns to synchronize with the network, a greatest value of the forwarding hop count is reset, and the first D2D synchronization information in which the synchronization source type is a network is forwarded according to a changed forwarding hop count.

Specifically, after performing synchronization according to the determined first D2D synchronization information in which the synchronization source is a network, the processing unit updates a greatest value of the forwarding hop counts, where a greatest value of the forwarding hop counts that is obtained after the update is greater than the greatest value of the forwarding hop counts that exists before the update; and when determining that the current forwarding hop count is less than the greatest value of the forwarding hop counts that is obtained after the update, updates the forwarding hop count in the first D2D synchronization information, to obtain the second D2D synchronization information. The sending unit sends the second D2D synchronization information, and the sending unit sends the greatest value of the forwarding hop counts that is obtained after the update.

In actual application, because a signal on a transmitter device submerges a signal on a receiver, a device cannot send and receive a signal on a same time resource. To avoid that the device receives and sends a D2D synchronization signal on a same time resource, the following three optional implementation manners are used:

Manner 1: When the receiving unit receives a D2D synchronization signal by using any one of radio frames used for sending a D2D synchronization signal, the sending unit transmits a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Manner 2: When the receiving unit receives a D2D synchronization signal by using any resource that is used for a D2D synchronization signal and that is included in a radio frame used for sending a D2D synchronization signal, the sending unit sends a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Manner 3: After determining that a D2D synchronization signal needs to be sent, the sending unit sends only the D2D synchronization signal within a set quantity of transmission cycles; and the receiving unit does not receive any D2D synchronization signal within the set quantity of transmission cycles.

Figure 2:
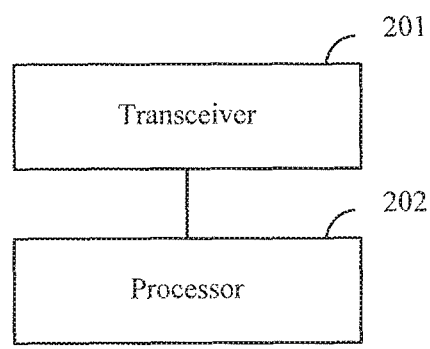
FIG. 2 is a schematic structural diagram of a device in D2D communication according to Embodiment 2.

In Embodiment 2, as shown in FIG. 2, a device of another structure in D2D communication is provided, where the device includes a transceiver 201 and a processor 202.

The transceiver 201 receives first D2D synchronization information sent by a first device in D2D communication, where the first D2D synchronization information includes a synchronization source identifier and a forwarding hop count.

The processor 202 determines a synchronization source according to the synchronization source identifier in the first D2D synchronization information received by the transceiver 201; synchronizes with the synchronization source, when determining that the forwarding hop count in the first D2D synchronization information is less than a set threshold; updates the forwarding hop count carried in the first D2D synchronization information, so as to obtain second D2D synchronization information; and instructs the transceiver 201 to send the second D2D synchronization information.

Preferably, the first D2D synchronization information is carried in a D2D synchronization signal sent by the first device; or the first D2D synchronization information includes first-part D2D synchronization information and second-part D2D synchronization information, where the first-part D2D synchronization information is carried in a D2D synchronization signal sent by the first device, and the second-part D2D synchronization information is sent by the first device through a physical D2D synchronization channel (PD2DSCH).

In specific implementation, a transmission cycle of the D2D synchronization signal and a transmission cycle of the PD2DSCH may be the same or may be different.

The D2D synchronization signal may include a primary D2D synchronization signal or a secondary D2D synchronization signal (SD2DSS), or may include both a PD2DSS and an SD2DSS.

In this embodiment, there may be the following several optional implementation manners according to different manners in which the synchronization information carries the synchronization source identifier and the forwarding hop count.

Manner 1: The processor 202 is specifically configured to: determine, according to a preset correspondence between an SD2DSS and a synchronization source identifier, a synchronization source identifier that is corresponding to the SD2DSS, carried in the D2D synchronization signal, and received by the transceiver 201; and synchronize with a synchronization source corresponding to the determined synchronization source identifier; determine, according to a preset correspondence between a PD2DSS and a forwarding hop count, a forwarding hop count that is corresponding to the PD2DSS, carried in the D2D synchronization signal, and received by the transceiver 201; and when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; after the PD2DSS in the received D2D synchronization signal is replaced with the determined PD2DSS, use a D2D synchronization signal with the replaced PD2DSS as the second D2D synchronization information; and instruct the transceiver 201 to send the second D2D synchronization information.

Manner 2: The processor 202 is specifically configured to: determine a synchronization source identifier according to indication information, received by the transceiver 201 based on the PD2DSCH, of the synchronization source identifier; and synchronize with a synchronization source corresponding to the determined synchronization source identifier; determine, according to a preset correspondence between a PD2DSS and a forwarding hop count, a forwarding hop count that is corresponding to the PD2DSS, carried in the D2D synchronization signal, and received by the receiving unit; and when the determined forwarding hop count is less than the set threshold, use a sum of the determined forwarding hop count and a set value as a current forwarding hop count; determine, according to the preset correspondence between a PD2DSS and a forwarding hop count, a PD2DSS corresponding to the current forwarding hop count; after the PD2DSS in the received D2D synchronization signal is replaced with the determined PD2DSS, use a D2D synchronization signal obtained after PD2DSS replacement as first-part D2D synchronization information of the second D2D synchronization information, and use the indication information of the synchronization source identifier as second-part D2D synchronization information that is sent through the PD2DSCH and that is of the second D2D synchronization information, to obtain the second D2D synchronization information; and instruct the transceiver 201 to send the second D2D synchronization information.

Manner 3: The processor 202 is specifically configured to: determine, according to a preset correspondence between an SD2DSS and a synchronization source identifier, a synchronization source identifier that is corresponding to the SD2DSS, carried in the D2D synchronization signal, and received by the transceiver 201; and synchronize with a synchronization source corresponding to the determined synchronization source identifier; and determine a forwarding hop count according to indication information, received by the transceiver 201 based on the PD2DSCH, of the forwarding hop count; when the determined forwarding hop count is less than the set threshold, use a sum of the determined forwarding hop count and a set value as a current forwarding hop count; use the D2D synchronization signal that carries the SD2DSS as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information; and instruct the transceiver to send the second D2D synchronization information.

Manner 4: The processor 202 is specifically configured to: determine, according to a preset correspondence between an SD2DSS and a synchronization source identifier and between an SD2DSS and a forwarding hop count, a synchronization source identifier and a forwarding hop count that are corresponding to the SD2DSS, carried in the D2D synchronization signal, and received by the transceiver 201; and synchronize with a synchronization source corresponding to the determined synchronization source identifier; and when the determined forwarding hop count is less than the set threshold, use a sum of the determined forwarding hop count and a set value as a current forwarding hop count; determine, according to the preset correspondence between an SD2DSS and a synchronization source identifier and between an SD2DSS and a forwarding hop count, an SD2DSS corresponding to the synchronization source identifier and the current forwarding hop count; replace the SD2DSS in the D2D synchronization signal with the determined SD2DSS; use a D2D synchronization signal obtained after SD2DSS replacement as the second D2D synchronization information; and instruct the transceiver 201 to send the second D2D synchronization information.

The preset correspondence between an SD2DSS and a synchronization source identifier and between an SD2DSS and a forwarding hop count includes: the preset correspondence between an SD2DSS and a forwarding hop count satisfying $N_k = \mod(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \text{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

Manner 5: The processor 202 is specifically configured to: determine, according to a preset correspondence between a synchronization source identifier and a combination of a PD2DSS and an SD2DSS, a synchronization source identifier that is corresponding to a combination of the PD2DSS and the SD2DSS, carried in the D2D synchronization signal, and received by the transceiver 201; and synchronize with a synchronization source corresponding to the determined synchronization source identifier; and determine a forwarding hop count according to indication information, received by the transceiver based on the PD2DSCH, of the forwarding hop count; when the determined forwarding hop count is less than the set threshold, use a sum of the determined forwarding hop count and a set value as a current forwarding hop count; and use the D2D synchronization signal as first-part D2D synchronization information of the second D2D synchronization information, and use indication information of the current forwarding hop count as second-part D2D synchronization information that is sent through the PD2DSCH and that is of the second D2D synchronization information, to obtain the second D2D synchronization information; and instruct the transceiver 201 to send the second D2D synchronization information.

The preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ represents a maximum quantity of SD2DSSes.

Manner 6: The processor 202 is specifically configured to: determine, according to a preset correspondence between a synchronization source identifier and a PD2DSS-SD2DSS group, a synchronization source identifier that is corresponding to a PD2DSS-SD2DSS group to which a combination of the PD2DSS and the SD2DSS, carried in the D2D synchronization signal, and received by the transceiver 201 belongs; and synchronize with a synchronization source corresponding to the determined synchronization source identifier; and determine, according to a preset correspondence between an SD2DSS and a forwarding hop count, a forwarding hop count that is corresponding to the SD2DSS in the combination of the PD2DSS and the SD2DSS, carried in the D2D synchronization, and received by the transceiver 201; when the determined forwarding hop count is less than the set threshold, use a sum of the determined forwarding hop count and a set value as a current forwarding hop count; acquire, according to the preset correspondence between an SD2DSS and a forwarding hop count, an SD2DSS corresponding to the current forwarding hop count; determine a combination of a PD2DSS and an SD2DSS that is corresponding to the acquired SD2DSS and that is included in the PD2DSS-SD2DSS group to which the combination of the PD2DSS and the SD2DSS carried in the received D2D synchronization signal belongs; replace the combination of the PD2DSS and the SD2DSS in the D2D synchronization signal with the determined combination of the PD2DSS and the SD2DSS; use a D2D synchronization signal obtained after replacement of the combination of the PD2DSS and the SD2DSS as the second D2D synchronization information; and instruct the transceiver 201 to send the second D2D synchronization information.

A number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

In a specific embodiment, a device in D2D communication may simultaneously receive multiple pieces of first D2D synchronization information. In this case, one piece of the first D2D synchronization information needs to be selected according to a preset selection rule and synchronization is performed.

When multiple pieces of first D2D synchronization information are received, there are the following two processing manners according to synchronization source types carried in the pieces of first D2D synchronization information:

Manner 1: The transceiver 201 receives multiple pieces of first D2D synchronization information; the processor 202 determines, according to synchronization source types carried in the multiple pieces of first D2D synchronization information that are received by the transceiver 201, that the multiple pieces of first D2D synchronization information are of a same synchronization source type. For example, the processor 202 determines, according to the synchronization source types, that the pieces of first D2D synchronization information come from different devices in D2D communication, or determines, according to the synchronization source types, that the pieces of first D2D synchronization information come from a network side.

Preferably, performing selection according to forwarding hop counts carried in the first D2D synchronization information includes: when determining that the transceiver 201 receives more than one piece of first D2D synchronization information, separately acquiring, by the processor 202, forwarding hop counts carried in the received pieces of first D2D synchronization information; determining a minimum value of the acquired forwarding hop counts; and when determining that the minimum value is less than the set threshold, synchronizing with a synchronization source corresponding to a synchronization source identifier in first D2D synchronization information corresponding to the minimum value.

Further, when the minimum value is corresponding to more than one piece of first D2D synchronization information, the processor 202 determines signal strengths of the pieces of first D2D synchronization information corresponding to the minimum value; and performs synchronization according to first D2D synchronization information corresponding to a greatest value of the signal strengths.

Similarly, in this specific embodiment, if determining that the forwarding hop counts carried in the pieces of first D2D synchronization information that are received by the transceiver 201 are the same and the forwarding hop counts are less than the set threshold, the processor 202 determines signal strengths of the pieces of first D2D synchronization information, and performs synchronization according to first D2D synchronization information corresponding to a greatest value of the signal strengths.

Preferably, in this specific embodiment, after the forwarding hop counts carried in the pieces of first D2D synchronization information are acquired, if determining that the minimum value of the forwarding hop counts is not less than the set threshold, the processor 202 discards all the first D2D synchronization information. Optionally, the transceiver 201 receives, within set duration, first D2D synchronization information sent by another device. If determining that the receiving unit has not received the first D2D synchronization information within the set duration, the processor 202 generates the second D2D synchronization information by using the device as a synchronization source and an identifier of the device as a synchronization source identifier and by setting the current forwarding hop count to an initial value, and instructs the sending unit to send the second D2D synchronization information, so that the another adjacent device and the device are synchronized in time and frequency.

Manner 2: The transceiver 201 receives multiple pieces of first D2D synchronization information; the processor 202 determines, according to synchronization source types carried in the multiple pieces of first D2D synchronization information that are received by the transceiver 201, that the multiple pieces of first D2D synchronization information are of different synchronization source types. For example, the processor 202 determines, according to the synchronization source types, that one piece of the first D2D synchronization information comes from a network side, or that the other pieces of the first D2D synchronization information come from different devices in D2D communication respectively.

Preferably, when determining that the transceiver 201 receives more than one piece of first D2D synchronization information, the processor 202 determines, according to synchronization source types carried in the pieces of first D2D synchronization information, first D2D synchronization information in which a synchronization source is a network, and performs synchronization according to the determined first D2D synchronization information.

Preferably, after determining the first D2D synchronization information in which the synchronization source is a network, the processor 202 acquires a forwarding hop count carried in the determined first D2D synchronization information in which the synchronization source is a network; and if determining that the forwarding hop count is less than the set threshold, performs synchronization according to the determined first D2D synchronization information in which the synchronization source is a network; or if determining that the forwarding hop count is not less than the set threshold, selects one piece of the first D2D synchronization information from the other pieces of the first D2D synchronization information in the foregoing first processing manner and performs synchronization.

The preset threshold is set in advance. In actual application, the preset threshold may be determined according to synchronization precision on a network side and a reduction value of synchronization precision caused by each time of forwarding (a forwarding hop count of one) between devices, that is, it is ensured that synchronization precision corresponding to the preset threshold is higher than a threshold, so as to ensure synchronization precision between devices in D2D communication, and also to avoid a reduction of stability caused when excessive devices synchronize with a same synchronization source.

Optionally, after a device in D2D communication receives the first D2D synchronization information in which the synchronization source type is a network, if the device has synchronized with another synchronization source type (for example, another device in D2D communication) before, the device turns to synchronize with the network. Preferably, after the device turns to synchronize with the network, a greatest value of the forwarding hop count is reset, and the first D2D synchronization information in which the synchronization source type is a network is forwarded according to a changed forwarding hop count.

Specifically, after performing synchronization according to the determined first D2D synchronization information in which the synchronization source is a network, the processor 202 updates a greatest value of the forwarding hop counts, where a greatest value of the forwarding hop counts that is obtained after the update is greater than the greatest value of the forwarding hop counts that exists before the update; when determining that the forwarding hop count carried in the first D2D synchronization information is less than the greatest value of the forwarding hop counts that is obtained after the update, updates the forwarding hop count in the first D2D synchronization information, to obtain the second D2D synchronization information; and instructs the transceiver 201 to send the second D2D synchronization information and instructs the transceiver 201 to send the greatest value of the forwarding hop counts that is obtained after the update.

In actual application, because a signal on a transmitter device submerges a signal on a receiver, a device cannot send and receive a signal on a same time resource. To avoid that the device receives and sends a D2D synchronization signal on a same time resource, the following three optional implementation manners are used:

Manner 1: When receiving a D2D synchronization signal by using any one of radio frames used for sending a D2D synchronization signal, the transceiver 201 transmits a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Manner 2: When receiving a D2D synchronization signal by using any resource that is used for a D2D synchronization signal and that is included in a radio frame used for sending a D2D synchronization signal, the transceiver 201 sends a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Manner 3: After determining that a D2D synchronization signal needs to be sent, the transceiver 201 sends only the D2D synchronization signal within a set quantity of transmission cycles, and the transceiver 201 does not receive any D2D synchronization signal within the set quantity of transmission cycles.

Figure 3:
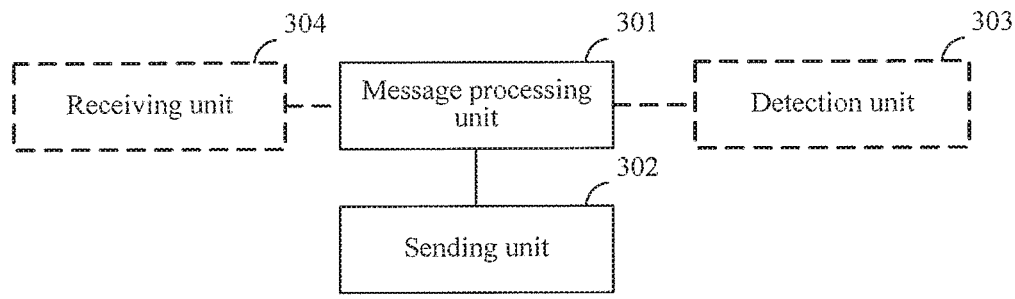
FIG. 3 is a schematic structural diagram of a device in D2D communication according to Embodiment 3.

In Embodiment 3, as shown in FIG. 3, another device in D2D communication is provided. The device includes: a message processing unit 301, configured to determine a synchronization source identifier and a forwarding hop count; and encapsulate the determined synchronization source identifier and forwarding hop count into first D2D synchronization information. The device also includes a sending unit 302, configured to send the first D2D synchronization information processed by the message processing unit 301.

If the device serves as a synchronization source, the synchronization source identifier determined by the message processing unit 301 is an identifier of the device. If a network device (for example, a base station) serves as a synchronization source, the synchronization source identifier determined by the message processing unit 301 is an identifier of the network device with which the device synchronizes.

Preferably, the first D2D synchronization information further includes a synchronization source type.

Preferably, the first device further includes a detection unit 303 and a receiving unit 304.

The detection unit 303 is configured to detect a downlink synchronization signal sent by a network.

When determining that the detection unit 303 has not detected the downlink synchronization signal, the message processing unit 301 instructs the sending unit to send the first D2D synchronization information; or after determining that the detection unit 303 has detected the downlink synchronization signal, determines that the receiving unit 304 has received third D2D synchronization information sent by another device; determines, according to a synchronization source type in the third D2D synchronization information, that a synchronization source is not a network device; and instructs the sending unit to send the first D2D synchronization information.

In specific implementation, the first D2D synchronization information sent by the sending unit 302 may be different from or the same as a time-frequency resource on which the downlink synchronization signal that is sent by the network and that is received by the receiving unit 303 is located.

Optionally, the sending unit 302 is specifically configured to: send a D2D synchronization signal, where the D2D synchronization signal carries the first D2D synchronization information; or send a D2D synchronization signal, where the D2D synchronization signal carries first-part D2D synchronization information of the first D2D synchronization information; and send second-part D2D synchronization information of the first D2D synchronization information through a physical D2D synchronization channel PD2DSCH, where the first-part D2D synchronization information and the second-part D2D synchronization information are combined into the first D2D synchronization information.

In actual application, a transmission cycle of the D2D synchronization signal and a transmission cycle of the PD2DSCH may be different or may be the same.

Preferably, the D2D synchronization signal includes a primary D2D synchronization signal PD2DSS and/or a secondary D2D synchronization signal SD2DSS.

Corresponding to Embodiment 1, in this embodiment, there may be the following several optional implementation manners according to different manners in which the synchronization information carries the synchronization source identifier and the forwarding hop count.

Manner 1: The message processing unit 301 is specifically configured to: acquire, according to a preset correspondence between a PD2DSS and a forwarding hop count, a PD2DSS corresponding to the determined forwarding hop count; acquire, according to a preset correspondence between an SD2DSS and a synchronization source identifier, an SD2DSS corresponding to the determined synchronization source identifier; add the acquired PD2DSS and SD2DSS to the D2D synchronization signal; and use the D2D synchronization signal that carries the PD2DSS and the SD2DSS as the first D2D synchronization information.

Manner 2: The message processing unit 301 is specifically configured to: acquire, according to a preset correspondence between a PD2DSS and a forwarding hop count, a PD2DSS corresponding to the determined forwarding hop count; add the acquired PD2DSS to the D2D synchronization signal; use the D2D synchronization signal that carries the PD2DSS as the first-part D2D synchronization information of the first D2D synchronization information; and use indication information of the determined synchronization source identifier as the second-part D2D synchronization information that is sent through the PD2DSCH and that is of the first D2D synchronization information.

Manner 3: The message processing unit 301 is specifically configured to: acquire, according to a preset correspondence between an SD2DSS and a synchronization source identifier, an SD2DSS corresponding to the determined synchronization source identifier; and add the acquired SD2DSS and a preset PD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information, where PD2DSSes preset for all synchronization sources are the same in D2D communication.

Manner 4: The message processing unit 301 is specifically configured to: acquire, according to a preset correspondence between an SD2DSS and a synchronization source identifier and between an SD2DSS and a forwarding hop count, an SD2DSS corresponding to the determined synchronization source identifier and forwarding hop count; and add the SD2DSS to the D2D synchronization signal, and use the D2D synchronization signal as the first D2D synchronization information.

Specifically, the preset correspondence between an SD2DSS and a synchronization source identifier and between an SD2DSS and a forwarding hop count includes: the preset correspondence between an SD2DSS and a forwarding hop count satisfying $N_k = \mod(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \text{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

Manner 5: The message processing unit 301 is specifically configured to: acquire, according to a preset correspondence between a synchronization source identifier and a combination of a PD2DSS and an SD2DSS, a combination of a PD2DSS and an SD2DSS that corresponds to the determined synchronization source identifier; and add the acquired combination of a PD2DSS and an SD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information.

Specifically, the preset correspondence between a synchronization source identifier and a combination of a PD2DSS and an SD2DSS includes: the preset correspondence between a synchronization source identifier and a combination of a PD2DSS and an SD2DSS satisfying $N_{ID} = M_s N_{ID}^{(1)} + N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \le N_{ID}^{(1)} \le (M_s-1)$, $0 \le N_{ID}^{(2)} \le (N_s-1)$, $M_s$ represents a maximum quantity of PD2DSSes, and $N_s$ represents a maximum quantity of SD2DSSes.

Manner 6: The message processing unit 301 is specifically configured to: acquire, according to a preset correspondence between a synchronization source identifier and a PD2DSS-SD2DSS group, a PD2DSS-SD2DSS group corresponding to the determined synchronization source identifier, where each PD2DSS-SD2DSS group includes multiple combinations of a PD2DSS and an SD2DSS; acquire, according to a preset correspondence between an SD2DSS and a forwarding hop count, an SD2DSS corresponding to the determined forwarding hop count; and determine a combination of a PD2DSS and an SD2DSS that includes the acquired SD2DSS and that is in the acquired PD2DSS-SD2DSS group; and add the determined combination of a PD2DSS and an SD2DSS to the D2D synchronization signal; and use the D2D synchronization signal as the first D2D synchronization information.

Preferably, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

Preferably, to avoid that in D2D communication, multiple different devices serving as synchronization sources add a same synchronization source identifier to the first D2D synchronization information, in this embodiment, the processing unit is further configured to: convert, according to a set cycle, the synchronization source identifier carried in the first D2D synchronization information.

According to different manners in which the first D2D synchronization information carries the synchronization source identifier, a purpose of converting the synchronization source identifier carried in the synchronization information may be achieved in the following specific changing manner, including: converting, by the processing unit according to the set cycle, the SD2DSS carried in the D2D synchronization signal; or converting, according to the set cycle, the PD2DSS carried in the D2D synchronization signal; or converting, according to the set cycle, the PD2DSS carried in the D2D synchronization signal, and changing, according to the set cycle, the SD2DSS carried in the D2D synchronization signal.

In a specific implementation manner, a specific method for changing the PD2DSS and/or SD2DSS used for indicating the synchronization source identifier is: in the $m^{th}$ set cycle, a sequence number of the PD2DSS/SD2DSS is $N_{ID}^{(2)}(m)=\text{mod}(\text{IMSI}+\text{Nframe}(m),\text{Ns})$, where $N_{ID}^{(2)}$ represents a sequence number of the PD2DSS/SD2DSS or a synchronization source identifier, IMSI is an international mobile subscriber identity, Nframe(m) represents a number of a radio frame on which the device is located when the PD2DSS/SD2DSS carried in the D2D synchronization signal is changed for the $m^{th}$ time, and $N_s$ represents a maximum quantity of PD2DSSes/SD2DSSes or a maximum quantity of identifiable synchronization sources.

In another specific implementation manner, a specific method for changing the PD2DSS and/or SD2DSS used for indicating the synchronization source identifier is: in the $m^{th}$ set cycle, a sequence number of the PD2DSS/SD2DSS is $N_{ID}^{(2)}(m)=\text{mod}(\text{IMSI} \times (N_{ID}^{(2)}(m-1)+a),\text{Ns})$, where when m is equal to 0, $N_{ID}^{(2)}(0)=\text{mod}(\text{IMSI}+\text{Nframe}(0),\text{Ns})$, $N_{ID}^{(2)}$ represents a sequence number of the PD2DSS/SD2DSS or a synchronization source identifier, IMSI is an international mobile subscriber identity, $N_s$ represents a maximum quantity of PD2DSSes/SD2DSSes or a maximum quantity of identifiable synchronization sources, a represents a non-zero integer, and Nframe(0) represents a number of a radio frame on which the device is located when the D2D synchronization signal is sent for the first time.

The PD2DSS and/or SD2DSS that is used for indicating the synchronization source identifier and that is in the D2D synchronization signal is converted, which may avoid a problem that multiple adjacent synchronization sources carry a same synchronization source identifier, so as to avoid a co-channel interference and to facilitate detection on adjacent synchronization source identifiers.

In this embodiment, when the device serves as a synchronization source, when the first D2D synchronization information is sent, a downlink synchronization signal from a network may be received, or a synchronization signal from another synchronization source may be received. In actual application, because a signal on a transmitter device submerges a signal on a receiver, a device cannot send and receive a signal on a same time resource. To avoid that the device receives and sends a D2D synchronization signal on a same time resource, the following three optional implementation manners are used:

Manner 1: The sending unit is specifically configured to: when the receiving unit receives a D2D synchronization signal by using any one of radio frames used for sending a D2D synchronization signal, transmit a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Manner 2: The sending unit is specifically configured to: when the receiving unit receives a D2D synchronization signal by using any resource that is used for a D2D synchronization signal and that is included in a radio frame used for sending a D2D synchronization signal, send a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Manner 3: The sending unit is specifically configured to: after determining that a D2D synchronization signal needs to be sent, send only the D2D synchronization signal within a set quantity of transmission cycles, where the receiving unit does not receive any D2D synchronization signal within the set quantity of transmission cycles.

Figure 4:
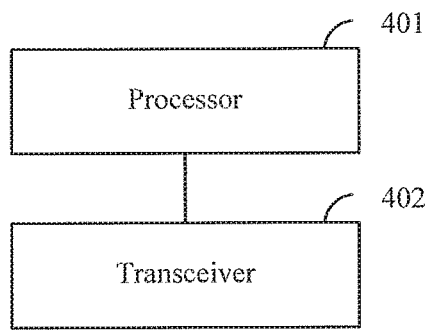
FIG. 4 is a schematic structural diagram of a device in D2D communication according to Embodiment 4.

In Embodiment 4, as shown in FIG. 4, a device of another structure in D2D communication is provided, where the device includes a processor 401 and a transceiver 402.

The processor 401 determines a synchronization source identifier and a forwarding hop count, and encapsulates the determined synchronization source identifier and forwarding hop count into first D2D synchronization information.

The transceiver 402 sends the first D2D synchronization information processed by the processor 401.

Preferably, the first D2D synchronization information further includes a synchronization source type.

The transceiver 402 is further configured to detect a downlink synchronization signal sent by a network.

When determining that the transceiver 402 has not detected the downlink synchronization signal, the processor 401 instructs the transceiver 402 to send the first D2D synchronization information; or after determining that the transceiver 402 has detected the downlink synchronization signal, determines that the transceiver 402 has received third D2D synchronization information sent by another device; determines, according to a synchronization source type in the third D2D synchronization information, that a synchronization source is not a network device; and instructs the transceiver 402 to send the first D2D synchronization information.

In specific implementation, the first D2D synchronization information sent by the transceiver 402 may be different from or the same as a time-frequency resource on which the received downlink synchronization signal sent by the network is located.

Optionally, the transceiver 402 is specifically configured to: send a D2D synchronization signal, where the D2D synchronization signal carries the first D2D synchronization information; or send a D2D synchronization signal, where the D2D synchronization signal carries first-part D2D synchronization information of the first D2D synchronization information; and send second-part D2D synchronization information of the first D2D synchronization information through a physical D2D synchronization channel PD2DSCH, where the first-part D2D synchronization information and the second-part D2D synchronization information are combined into the D2D synchronization information.

In actual application, a cycle of the D2D synchronization signal and a cycle of the PD2DSCH may be different or may be the same.

Preferably, the D2D synchronization signal includes a primary D2D synchronization signal PD2DSS and/or a secondary D2D synchronization signal SD2DSS.

Corresponding to Embodiment 1 and Embodiment 2, in this embodiment, there may be the following several optional implementation manners according to different manners in which the synchronization information carries the synchronization source identifier and the forwarding hop count:

Manner 1: The processor 401 is specifically configured to: acquire, according to a preset correspondence between a PD2DSS and a forwarding hop count, a PD2DSS corresponding to the determined forwarding hop count; acquire, according to a preset correspondence between an SD2DSS and a synchronization source identifier, an SD2DSS corresponding to the determined synchronization source identifier; add the acquired PD2DSS and SD2DSS to the D2D synchronization signal; and use the D2D synchronization signal that carries the PD2DSS and the SD2DSS as the first D2D synchronization information.

Optionally, the device further includes a memory, configured to store the preset correspondence between a PD2DSS and a forwarding hop count. The processor acquires the correspondence from the memory.

Manner 2: The processor 401 is specifically configured to: acquire, according to a preset correspondence between a PD2DSS and a forwarding hop count, a PD2DSS corresponding to the determined forwarding hop count; add the acquired PD2DSS to the D2D synchronization signal; use the D2D synchronization signal that carries the PD2DSS as the first-part D2D synchronization information of the first D2D synchronization information; and use indication information of the determined synchronization source identifier as the second-part D2D synchronization information that is sent through the PD2DSCH and that is of the first D2D synchronization information.

Optionally, the device further includes a memory, configured to store the preset correspondence between a PD2DSS and a forwarding hop count. The processor acquires the correspondence from the memory.

Manner 3: The processor 401 is specifically configured to: acquire, according to a preset correspondence between an SD2DSS and a synchronization source identifier, an SD2DSS corresponding to the determined synchronization source identifier; and add the acquired SD2DSS and a preset PD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information, where PD2DSSes preset for all synchronization sources are the same in D2D communication.

Optionally, the device further includes a memory, configured to store the preset correspondence between an SD2DSS and a synchronization source identifier. The processor acquires the correspondence from the memory.

Manner 4: The processor 401 is specifically configured to: acquire, according to a preset correspondence between an SD2DSS and a synchronization source identifier and between an SD2DSS and a forwarding hop count, an SD2DSS corresponding to the determined synchronization source identifier and forwarding hop count; and add the SD2DSS to the D2D synchronization signal, and use the D2D synchronization signal as the first D2D synchronization information.

Specifically, the preset correspondence between an SD2DSS and a synchronization source identifier and between an SD2DSS and a forwarding hop count includes: the preset correspondence between an SD2DSS and a forwarding hop count satisfying $N_k = \mod(N_{ID}^{(2)}, K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID} = \mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

Optionally, the device further includes a memory, configured to store the preset correspondence between an SD2DSS and a synchronization source identifier and between an SD2DSS and a forwarding hop count. The processor acquires the correspondence from the memory.

Manner 5: The processor 401 is specifically configured to: acquire, according to a preset correspondence between a synchronization source identifier and a combination of a PD2DSS and an SD2DSS, a combination of a PD2DSS and an SD2DSS that corresponds to the determined synchronization source identifier; and add the acquired combination of a PD2DSS and an SD2DSS to the D2D synchronization signal; use the D2D synchronization signal as the first-part D2D synchronization information of the first D2D synchronization information; and use indication information of the forwarding hop count as the second-part D2D synchronization information that is sent through the PD2DSCH and that is of the first D2D synchronization information.

Specifically, the preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ represents a maximum quantity of SD2DSSes.

Optionally, the device further includes a memory, configured to store the preset correspondence between a synchronization source identifier and a combination of a PD2DSS and an SD2DSS. The processor acquires the correspondence from the memory.

Manner 6: The processor 401 is specifically configured to: acquire, according to a preset correspondence between a synchronization source identifier and a PD2DSS-SD2DSS group, a PD2DSS-SD2DSS group corresponding to the determined synchronization source identifier, where each PD2DSS-SD2DSS group includes multiple combinations of a PD2DSS and an SD2DSS; acquire, according to a preset correspondence between an SD2DSS and a forwarding hop count, an SD2DSS corresponding to the determined forwarding hop count; and determine a combination of a PD2DSS and an SD2DSS that includes the acquired SD2DSS and that is in the acquired PD2DSS-SD2DSS group; and add the determined combination of a PD2DSS and an SD2DSS to the D2D synchronization signal; and use the D2D synchronization signal as the first D2D synchronization information.

Preferably, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

Optionally, the device further includes a memory, configured to store the preset correspondence between a synchronization source identifier and a PD2DSS-SD2DSS group, and store the preset correspondence between an SD2DSS and a forwarding hop count. The processor acquires the correspondences from the memory.

Preferably, to avoid that in D2D communication, multiple different devices serving as synchronization sources add a same synchronization source identifier to the first D2D synchronization information, in this embodiment, the processor is further configured to: convert, according to a set cycle, the synchronization source identifier carried in the first D2D synchronization information.

According to different manners in which the first D2D synchronization information carries the synchronization source identifier, a purpose of converting the synchronization source identifier carried in the synchronization information may be achieved in the following specific changing manner, including: converting, by the processor according to the set cycle, the SD2DSS carried in the D2D synchronization signal; or converting, according to the set cycle, the PD2DSS carried in the D2D synchronization signal; or converting, according to the set cycle, the PD2DSS carried in the D2D synchronization signal, and changing, according to the set cycle, the SD2DSS carried in the D2D synchronization signal.

In a specific implementation manner, a specific method for changing the PD2DSS and/or SD2DSS used for indicating the synchronization source identifier is: in the $m^{th}$ set cycle, a sequence number of the PD2DSS/SD2DSS is $N_{ID}^{(2)}(m)=\text{mod}(\text{IMSI}+\text{Nframe}(m)Ns)$, where $N_{ID}^{(2)}$ represents a sequence number of the PD2DSS/SD2DSS or a synchronization source identifier, IMSI is an international mobile subscriber identity, Nframe(m) represents a number of a radio frame on which the device is located when the PD2DSS/SD2DSS carried in the D2D synchronization signal is changed for the $m^{th}$ time, and $N_s$ represents a maximum quantity of PD2DSSes/SD2DSSes or a maximum quantity of identifiable synchronization sources.

In another specific implementation manner, a specific method for changing the PD2DSS and/or SD2DSS used for indicating the synchronization source identifier is:

in the $m^{th}$ set cycle, a sequence number of the PD2DSS/SD2DSS is $N_{ID}^{(2)}(m)=\text{mod}(\text{IMSI} \times (N_{ID}^{(2)}(m-1)+a), Ns)$, where when m is equal to 0, $N_{ID}^{(2)}(0)=\text{mod}(\text{IMSI}+\text{Nframe}(0), Ns)$, $N_{ID}^{(2)}$ represents a sequence number of the PD2DSS/SD2DSS or a synchronization source identifier, IMSI is an international mobile subscriber identity, $N_s$ represents a maximum quantity of PD2DSSes/SD2DSSes or a maximum quantity of identifiable synchronization sources, a represents a non-zero integer, and Nframe(0) represents a number of a radio frame on which the device is located when the D2D synchronization signal is sent for the first time.

The PD2DSS and/or SD2DSS that is used for indicating the synchronization source identifier and that is in the D2D synchronization signal is converted, which may avoid a problem that multiple adjacent synchronization sources carry a same synchronization source identifier, so as to avoid a co-channel interference and to facilitate detection on adjacent synchronization source identifiers.

In this embodiment, when the device serves as a synchronization source, when the first D2D synchronization information is sent, a downlink synchronization signal from a network may be received, or a synchronization signal from another synchronization source may be received. In actual application, because a signal on a transmitter device submerges a signal on a receiver, a device cannot send and receive a signal on a same time resource. To avoid that the device receives and sends a D2D synchronization signal on a same time resource, the following three optional implementation manners are used:

Manner 1: When receiving a D2D synchronization signal by using any one of radio frames used for sending a D2D synchronization signal, the transceiver transmits a D2D synchronization signal by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Manner 2: When receiving a D2D synchronization signal by using any resource that is used for a D2D synchronization signal and that is included in a radio frame used for sending a D2D synchronization signal, the transceiver sends a D2D synchronization signal by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Manner 3: After determining that a D2D synchronization signal needs to be sent, the transceiver sends only the D2D synchronization signal within a set quantity of transmission cycles, and does not receive any D2D synchronization signal within the set quantity of transmission cycles.

Figure 5A:
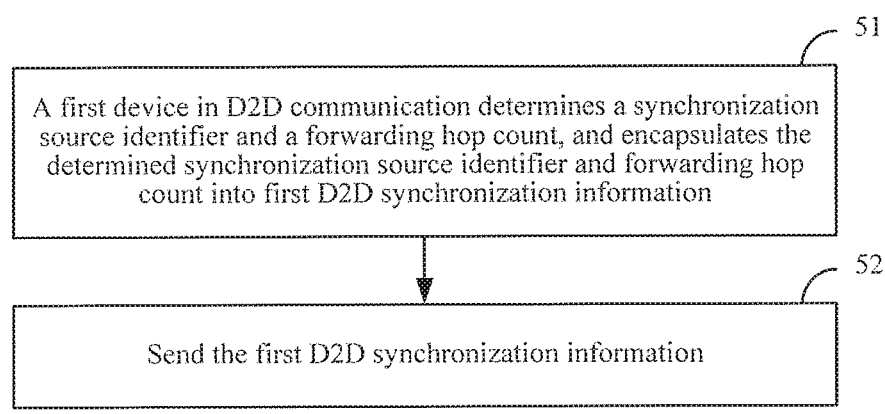
FIG. 5a is a schematic flowchart of sending synchronization information by a device in D2D communication according to an embodiment.

In Embodiment 5, based on a same principle, a method for sending synchronization information by a device in D2D communication is provided. As shown in FIG. 5a, the method mainly includes the following steps.

Step 51: A first device in D2D communication determines a synchronization source identifier and a forwarding hop count, and encapsulates the determined synchronization source identifier and forwarding hop count into first D2D synchronization information.

Step 52: Send the first D2D synchronization information, where a second device in D2D communication receives the first D2D synchronization information; synchronizes with a synchronization source corresponding to the synchronization source identifier in the first D2D synchronization information; and when determining that the forwarding hop count in the first D2D synchronization information is less than the set threshold, updates the forwarding hop count in the first D2D synchronization information and sends second D2D synchronization information obtained after update of the forwarding hop count.

The first device in D2D communication is a device serving as a synchronization source.

Optionally, the first D2D synchronization information further includes a synchronization source type.

Preferably, in this embodiment, when a device serving as a synchronization source is outside a network coverage area, the device generates and sends first D2D synchronization information, where a determined synchronization source identifier carried in the first D2D synchronization information is an identifier of the device serving as a synchronization source. If the device serving as a synchronization source is within the network coverage area, the device first synchronizes with a network; when determining that another adjacent device that is outside the network coverage area needs to be synchronized, the device sends first D2D synchronization information, where a determined synchronization source identifier carried in the first D2D synchronization information is an identifier of the network device with which the device serving as a synchronization source synchronizes.

Specifically, before sending the first D2D synchronization information, the first device in D2D communication detects a downlink synchronization signal sent by a network, and determines that the downlink synchronization signal is not detected; or the first device detects a downlink synchronization signal sent by a network; after determining that the downlink synchronization signal is detected, receives third D2D synchronization information sent by another device; and determines, according to a synchronization source type in the third D2D synchronization information, that a synchronization source is not a network device.

A time-frequency occupied by the first D2D synchronization information that is sent by the first device is different from a time-frequency resource occupied by the downlink synchronization signal that is sent by the network.

Figure 5B:
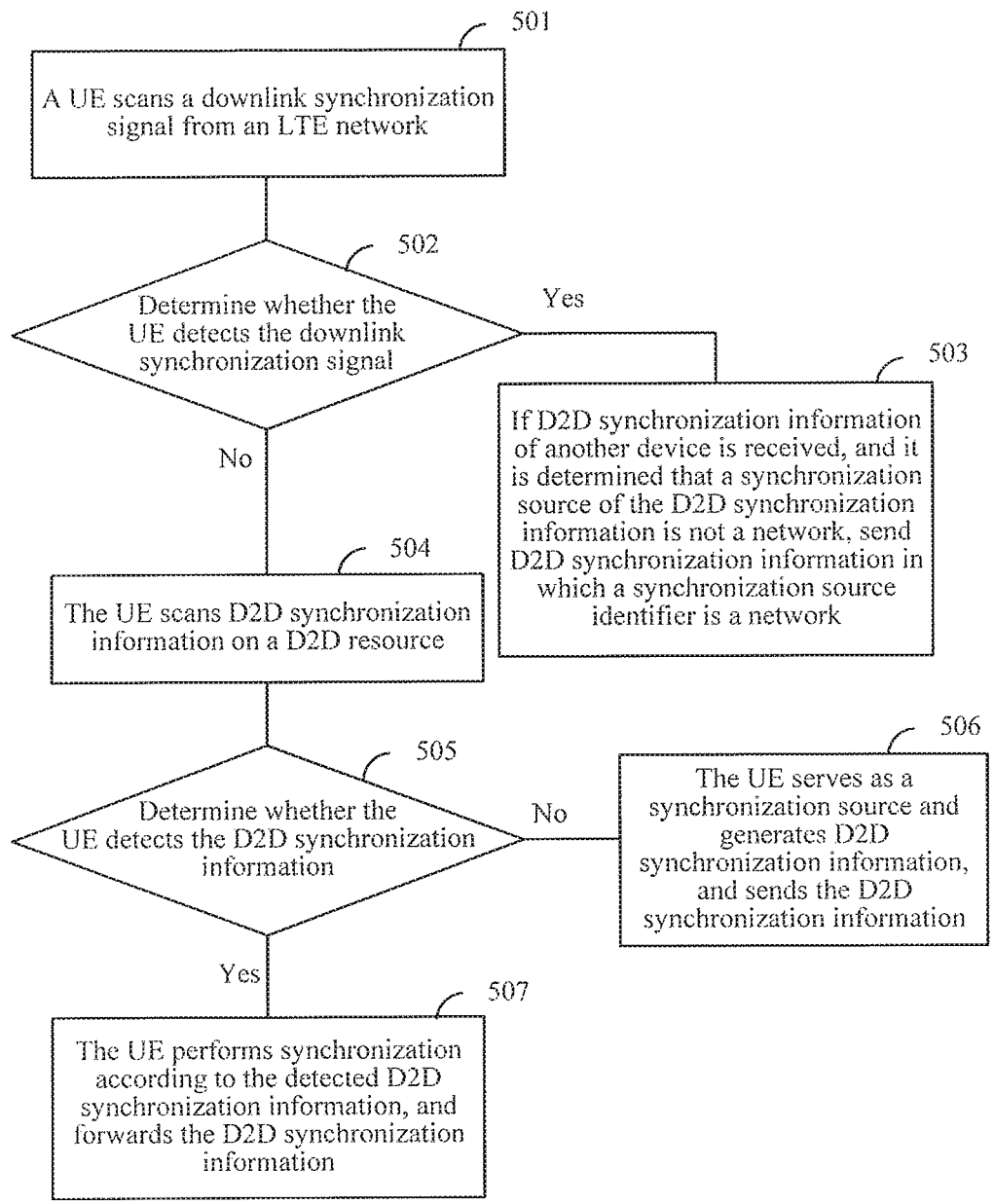
FIG. 5b is a schematic flowchart of performing synchronization by UE according to a network coverage status according to an embodiment.

For example, as shown in FIG. 5b, a specific process in which user equipment (UE) performs synchronization according to a network coverage status is as follows.

Step 501: The UE scans a downlink synchronization signal from an LTE network.

Step 502: Determine whether the UE has detected the downlink synchronization signal; if yes, perform step 503; and if not, perform step 504.

Step 503: When the UE is within a network coverage area, if D2D synchronization information of another device is received, and it is determined that a synchronization source of the D2D synchronization information is not a network, send D2D synchronization information in which a synchronization source identifier is a network.

Step 504: When the UE is outside a network coverage area, the UE scans D2D synchronization information on a D2D resource.

Step 505: Determine whether the UE detects the D2D synchronization information; if yes, perform step 507; and if not, perform step 506.

Step 506: The UE serves as a synchronization source and generates D2D synchronization information, and sends the D2D synchronization information.

Step 507: The UE performs synchronization according to the detected D2D synchronization information, and forwards the D2D synchronization information.

Preferably, after receiving D2D synchronization information in which a synchronization source type is a network, the UE outside the network coverage area synchronizes to the network according to the D2D synchronization information instead, and changes a greatest value of a forwarding hop count, where a greatest value obtained after the change is greater than a greatest value of a forwarding hop count in the D2D synchronization information in which the synchronization source is not a network.

Figure 5C:
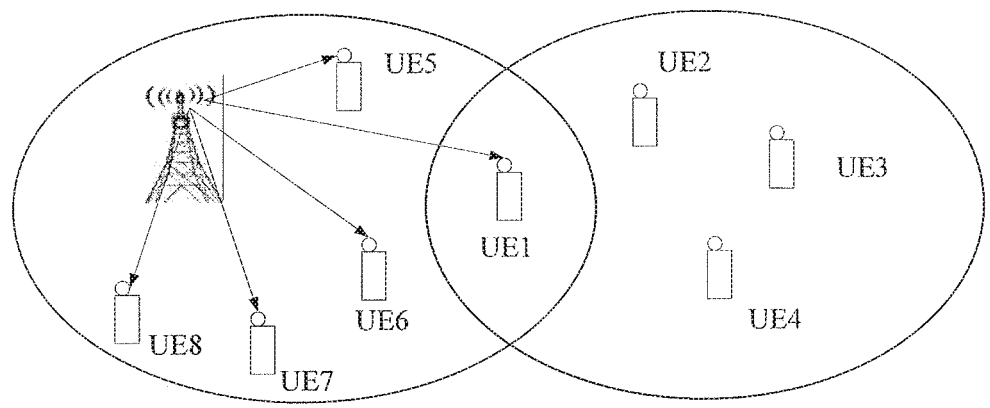
FIG. 5c is a schematic diagram of a scenario of partial network coverage according to an embodiment.
Figure 5D:
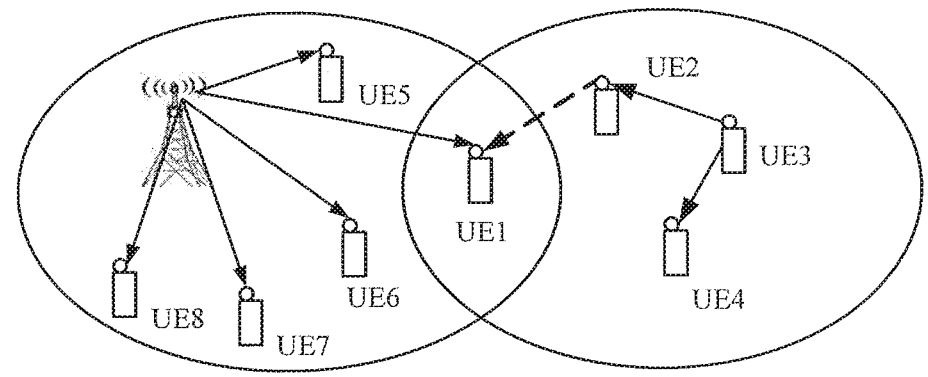
FIG. 5d is a schematic diagram of synchronization between UEs outside a network coverage area according to an embodiment.
Figure 5E:
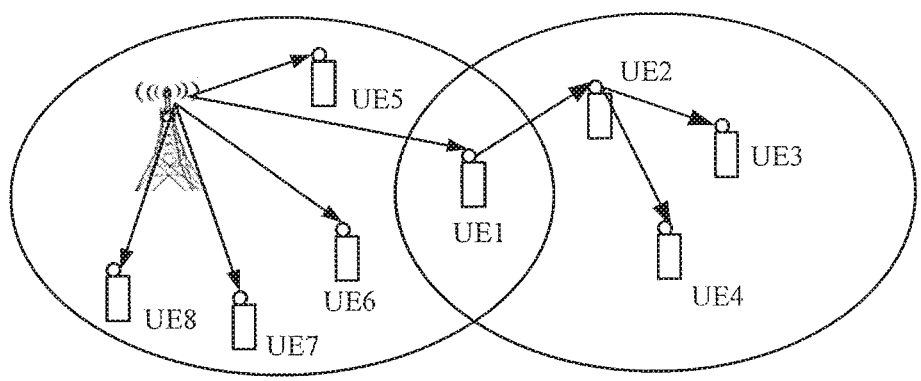
FIG. 5e is a schematic diagram of synchronization between UE outside a network coverage area and UE within the network coverage area according to an embodiment.

For example, as shown in FIG. 5c, in D2D communication, some UEs (for example, UE 1) are within a network coverage area, and some UEs (UE 2, UE 3, and UE 4) are outside the network coverage area. All UEs in D2D communication detect D2D synchronization information on a D2D resource. If no D2D synchronization information from the UEs outside the network coverage area is detected, the UE 1 within the network coverage area does not send any D2D synchronization information. The UEs outside the network coverage area periodically detect whether there is D2D synchronization information from the network coverage area. If no D2D synchronization information from the network coverage area is detected, as shown in FIG. 5*d*, the UE 3 outside the network coverage area serves as a synchronization source, and generates and sends D2D synchronization information to the UE 2 and the UE 4; the UE 2 forwards the D2D synchronization information in which the synchronization source is the UE 3 to the UE 1; the UE 1 determines, according to the received D2D synchronization information, that the synchronization source of the D2D synchronization information is the UE outside the network coverage area, and as shown in FIG. 5*e*, sends D2D synchronization information in which a synchronization source is a base station to the UE 2. When determining that the synchronization source of the D2D synchronization information is the base station, the UE 2 synchronizes to the base station instead, and forwards the D2D synchronization information in which the synchronization source is the base station to the UE 3 and the UE 4.

Optionally, the device sends a D2D synchronization signal, where the D2D synchronization signal carries the first D2D synchronization information; or the device sends a D2D synchronization signal, where the D2D synchronization signal carries first-part D2D synchronization information of the first D2D synchronization information, and sends second-part D2D synchronization information of the first D2D synchronization information through a physical D2D synchronization channel PD2DSCH, where the first-part D2D synchronization information and the second-part D2D synchronization information are combined into the first D2D synchronization information.

Optionally, if the first D2D synchronization information includes the synchronization source type, indication information of the synchronization source type may be carried in the D2D synchronization signal and sent, or may be sent through the PD2DSCH.

In actual application, a transmission cycle of the D2D synchronization signal and a transmission cycle of the PD2DSCH may be the same or may be different.

Optionally, the D2D synchronization signal includes a primary D2D synchronization signal PD2DSS and/or a secondary D2D synchronization signal SD2DSS.

In this embodiment, there may be the following several optional implementation manners according to different manners in which the synchronization information carries the synchronization source identifier and the forwarding hop count.

Manner 1: A PD2DSS corresponding to the determined forwarding hop count is acquired according to a preset correspondence between a PD2DSS and a forwarding hop count; an SD2DSS corresponding to the determined synchronization source identifier is acquired according to a preset correspondence between an SD2DSS and a synchronization source identifier; the acquired PD2DSS and SD2DSS are added to the D2D synchronization signal; and the D2D synchronization signal is used as the first D2D synchronization information.

For example, assuming that there are M PD2DSSes, mapping relationships between forwarding hop counts for UE to forward a D2D synchronization signal and the M PD2DSSes are preset. A simple mapping method is: For D2D synchronization signals from a same synchronization source, a maximum of K times of forwarding is allowed, that is, a greatest value of the forwarding hop count is K, where K is not greater than M, and the $i^{th}$ forwarding is corresponding to the $i^{th}$ PD2DSS, that is, a forwarding hop count i is corresponding to the $i^{th}$ PD2DSS. As shown in Table 1, in the table, M is 3, that is, a quantity of PD2DSSes is 3, which is only an example herein and is not used to impose a limitation on the present invention. Likewise, numbers of the PD2DSSes may be 0, 1, and 2, and corresponding forwarding hop counts may also be 0, 1, and 2, which differ from the content shown in Table 1 only in starting point, but representation methods are of no difference and should be considered as a same method. Besides, only ZC sequences with root sequence numbers of 25, 29, and 34 are used as examples in the table, whereas in actual application, another ZC sequence may also be used.

TABLE 1

| PD2DSS number | Root sequence number of a PD2DSS | Forwarding hop count indicated by a PD2DSS from a same synchronization source |
| --- | --- | --- |
| 1 | 25 | 1 |
| 2 | 29 | 2 |
| 3 | 34 | 3 |

For another example, still in the foregoing example, a specific synchronization process is as follows: Assuming that UE 1 detects a D2D synchronization signal, and that the D2D synchronization signal carries the $i^{th}$ PD2DSS, the UE 1 synchronizes timing and frequency of a receiver of the UE 1 to a synchronization source indicated by the received D2D. The UE 1 compares i and K. If i is greater than K, the UE 1 does not forward the D2D synchronization signal of the synchronization source; if i is not greater than K, the UE 1 replaces the $i^{th}$ PD2DSS carried in the D2D synchronization signal with the $(i+t)^{th}$ PD2DSS, and sends the D2D synchronization signal. Assuming that the UE 1 does not detect any D2D synchronization signal, the UE 1 sends a D2D synchronization signal on a D2D resource, where the D2D synchronization signal carries the first PD2DSS.

Figure 6:
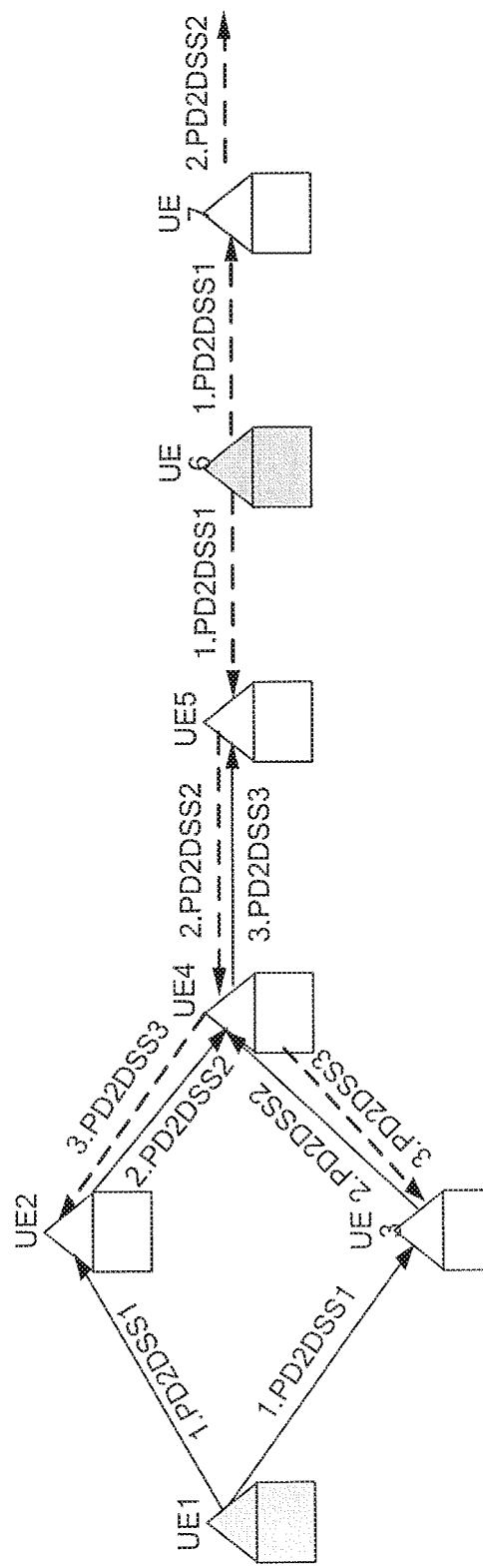
FIG. 6 shows an example of a synchronization process in which a PD2DSS is used to represent a forwarding hop count according to an embodiment.

Still in the foregoing example, as shown in FIG. 6, assuming that the UE 1 is a synchronization source, and that a D2D synchronization signal sent by the UE 1 carries a PD2DSS 1, both UE 2 and UE 3 receive the D2D synchronization signal carrying the PD2DSS 1, and the D2D synchronization signal of the synchronization source is forwarded once from the UE 1 to the UE 2 and the UE 3. The UE 2 and the UE 3 separately synchronize timing and frequency of their receivers to the UE 1, and the UE 2 and the UE 3, executing a second time of forwarding for the synchronization source, replace the PD2DSS 1 in the D2D synchronization signal with a PD2DSS 2. UE 4 receives the D2D synchronization signal carrying the PD2DSS 2, synchronizes timing and frequency of a receiver of the UE 4 to the synchronization source UE 1, executes a third time of forwarding, and replaces the PD2DSS 2 in the D2D synchronization signal with a PD2DSS 3. UE 5 receives the D2D synchronization signal carrying the PD2DSS 3, and synchronizes timing and frequency of a receiver of the UE 5 to the synchronization source UE 1. Because in this case, a maximum forwarding hop count 3 is reached, the UE 5 does not forward the D2D synchronization signal in which the synchronization source is the UE 1. UE 6 cannot receive the D2D synchronization signal, serves as a new synchronization source, and generates and sends a D2D synchronization signal, where the D2D synchronization signal carries the PD2DSS 1. The UE 5 and UE 7 receive the D2D synchronization signal from the UE 6 and also perform forwarding in the foregoing manner until the maximum forwarding hop count is reached.

In this implementation manner, if the SD2DSS is represented by an SSS in LTE, there may be at least 167 different SD2DSSes, and correspondingly, there may be at least 167 synchronization source identifiers.

In this implementation manner, when multiple D2D synchronization signals with a same forwarding hop count are from a same synchronization source, the multiple D2D synchronization signals may be directly combined to obtain a combination gain.

Manner 2: A PD2DSS corresponding to the determined forwarding hop count is acquired according to a preset correspondence between a PD2DSS and a forwarding hop count; the acquired PD2DSS is added to the D2D synchronization signal; the D2D synchronization signal is used as the first-part D2D synchronization information of the first D2D synchronization information; and indication information of the determined synchronization source identifier is used as the second-part D2D synchronization information that is sent based on the PD2DSCH and that is of the first D2D synchronization information.

Figure 7:
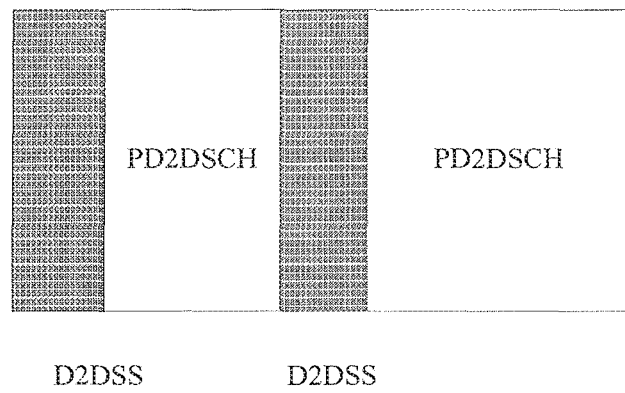
FIG. 7 is a schematic diagram of a PD2DSCH used in data transmission and a D2D synchronization signal.

For example, as shown in FIG. 7, during transmission of a D2D synchronization signal (D2DSS), data may be transmitted through a PD2DSCH, where the data may include at least indication information of a synchronization source identifier, and a cycle that a PD2DSCH signal appears is not less than a cycle that a D2D synchronization signal appears. That is, there is no PD2DSCH signal near some D2D synchronization signals, but there must be a D2D synchronization signal near a PD2DSCH signal.

D2D synchronization signals with a same forwarding hop count that are from a same synchronization source are the same, and content that is transmitted based on the PD2DSCH is the same.

In this implementation manner, at a stage of selecting a synchronization source, the PD2DSCH signal does not need to be parsed, and the PD2DSCH signal needs to be parsed only after the synchronization source is selected. In addition, when multiple D2D synchronization signals with a same forwarding hop count are from a same synchronization source, the multiple D2D synchronization signals may be directly combined to obtain a combination gain.

Manner 3: An SD2DSS corresponding to the determined synchronization source identifier is acquired according to a preset correspondence between an SD2DSS and a synchronization source identifier; and the acquired SD2DSS and a preset PD2DSS are added to the D2D synchronization signal; the D2D synchronization signal is used as the first-part D2D synchronization information of the first D2D synchronization information; and indication information of the determined forwarding hop count is used as the second-part D2D synchronization information that is sent through the PD2DSCH and that is of the first D2D synchronization information, where PD2DSSes preset for all synchronization sources are the same in D2D communication.

For example, different SD2DSSes indicate different synchronization sources. Assuming that there are Ns SD2DSSes in total, the Ns SD2DSSes may indicate Ns different synchronization sources, and the indication information of the forwarding hop count is sent through the PD2DSCH.

In this implementation manner, only one PD2DSS is preset for all UEs and different forwarding hop counts. When UE receives a PD2DSS, greater energy can be obtained by receiving the superimposed PD2DSS. In addition, the UE needs to detect only one PD2DSS, reducing detection complexity. A receiver of the UE only needs to demodulate, after finding multiple PD2DSS synchronization locations, SD2DSSes at the synchronization locations.

Manner 4: An SD2DSS corresponding to the determined synchronization source identifier and forwarding hop count is acquired according to a preset correspondence between an SD2DSS and a synchronization source identifier and between an SD2DSS and a forwarding hop count; and the SD2DSS is added to the D2D synchronization signal, and the D2D synchronization signal is used as the first D2D synchronization information.

For example, SD2DSSes are divided into M groups, a number of a group is corresponding to a forwarding hop count, and a sequence number of a PD2DSS in a group is corresponding to a synchronization source identifier.

Specifically, the preset correspondence between an SD2DSS and a synchronization source identifier and between an SD2DSS and a forwarding hop count includes: the preset correspondence between an SD2DSS and a forwarding hop count satisfying $N_k=\mathrm{mod}(N_{ID}^{(2)},K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID}=\mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

For example, assuming that a sequence number of an SD2DSS carried in a detected D2D synchronization signal is 125, and a preset maximum value of a forwarding hop count is 3, it can be calculated that a forwarding hop count is 2 and a synchronization source identifier is 41.

In this implementation manner, only a same PD2DSS may be preset for all UEs and forwarding hop counts, so that greater energy can be obtained by receiving the superimposed PD2DSS. In addition, UE needs to detect only one PD2DSS, reducing detection complexity, improving a speed for receiving a PD2DSS, and selecting a synchronization source without a need of receiving a PD2DSCH.

Manner 5: A combination of a PD2DSS and an SD2DSS that corresponds to the determined synchronization source identifier is acquired according to a preset correspondence between a synchronization source identifier and a combination of a PD2DSS and an SD2DSS; and the acquired combination of a PD2DSS and an SD2DSS is added to the D2D synchronization signal; the D2D synchronization signal is used as the first-part D2D synchronization information of the first D2D synchronization information; and indication information of the determined forwarding hop count is used as the second-part D2D synchronization information that is sent through the PD2DSCH and that is of the first D2D synchronization information.

Specifically, the preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \le N_{ID}^{(1)} \le (M_s-1)$, $0 \le N_{ID}^{(2)} \le (N_s-1)$, $M_s$ represents a maximum quantity of PD2DSSes, and $N_s$ represents a maximum quantity of SD2DSSes.

Manner 6: A PD2DSS-SD2DSS group corresponding to the determined synchronization source identifier is acquired according to a preset correspondence between a synchronization source identifier and a PD2DSS-SD2DSS group, where each PD2DSS-SD2DSS group includes multiple combinations of a PD2DSS and an SD2DSS; an SD2DSS corresponding to the determined forwarding hop count is acquired according to a preset correspondence between an SD2DSS and a forwarding hop count; and a combination of a PD2DSS and an SD2DSS that includes the acquired SD2DSS and that is in the acquired PD2DSS-SD2DSS group is determined; and the determined combination of a PD2DSS and an SD2DSS is added to the D2D synchronization signal; and the D2D synchronization signal is used as the first D2D synchronization information.

Optionally, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

For example, assuming that there are M PD2DSSes, and after receiving a PD2DSS of a synchronization source, UE uses the same PD2DSS to perform forwarding, and a maximum of K times of forwarding is allowed. If UE 1 receives the $m^{th}$ PD2DSS and the $n_k^{th}$ SD2DSS that are carried in the $k^{th}$ hop of D2D synchronization signal from UE A, the UE 1 synchronizes timing and frequency of a receiver of the UE 1 to a synchronization source indicated by the PD2DSS. The UE 1 compares k and K. If k is greater than K, the UE 1 does not send the D2D synchronization signal; if k is not greater than K, the UE 1 sends the D2D synchronization signal, where the sent D2D synchronization signal carries the $m^{th}$ PD2DSS and the $n_{k+1}^{th}$ SD2DSS.

Preferably, in the first to the sixth implementation manners, if D2D synchronization signals corresponding to a same synchronization source carry a same PD2DSS, the D2D synchronization signals that carry the same PD2DSS and that are received within a set time may be received after combination, so as to obtain a combination gain from receiving.

Preferably, in the first to the sixth implementation manners, if data content that is transmitted by using the PD2DSCH, that has a same forwarding hop count, and that is corresponding to a same synchronization source is the same, data content may also be combined to obtain a synchronization gain.

Preferably, to avoid that in D2D communication, multiple different devices serving as synchronization sources add a same synchronization source identifier to the first D2D synchronization information, in this embodiment, the synchronization source identifier carried in the first D2D synchronization information is converted according to a set cycle.

According to different manners in which the first D2D synchronization information carries the synchronization source identifier, a purpose of converting the synchronization source identifier carried in the synchronization information may be achieved in the following specific changing manner, including: converting, according to the set cycle, the SD2DSS carried in the D2D synchronization signal; or converting, according to the set cycle, the PD2DSS carried in the D2D synchronization signal; or converting, according to the set cycle, the PD2DSS carried in the D2D synchronization signal, and changing, according to the set cycle, the SD2DSS carried in the D2D synchronization signal.

In a first specific implementation manner, a specific method for changing the PD2DSS and/or SD2DSS used for indicating the synchronization source identifier is: in the $m^{th}$ set cycle, a sequence number of the PD2DSS/SD2DSS is $N_{ID}^{(2)}(m)=\mod(IMSI+Nframe(m),Ns)$, where $N_{ID}^{(2)}$ represents a sequence number of the PD2DSS/SD2DSS or a synchronization source identifier, IMSI is an international mobile subscriber identity, Nframe(m) represents a number of a radio frame on which the device is located when the PD2DSS/SD2DSS carried in the D2D synchronization signal is changed for the $m^{th}$ time, and $N_s$ represents a maximum quantity of PD2DSSes/SD2DSSes or a maximum quantity of identifiable synchronization sources.

In a second specific implementation manner, a specific method for changing the PD2DSS and/or SD2DSS used for indicating the synchronization source identifier is: in the $m^{th}$ set cycle, a sequence number of the PD2DSS/SD2DSS is $N_{ID}^{(2)}(m)=\mod(IMSI \times (N_{ID}^{(2)}(m-1)+a),Ns)$, where when m is equal to 0, $N_{ID}^{(2)}(0)=\mod(IMSI+Nframe(0),Ns)$, $N_{ID}^{(2)}$ represents a sequence number of the PD2DSS/SD2DSS or a synchronization source identifier, IMSI is an international mobile subscriber identity, $N_s$ represents a maximum quantity of PD2DSSes/SD2DSSes or a maximum quantity of identifiable synchronization sources, a represents a non-zero integer, and Nframe(0) represents a number of a radio frame on which the device is located when the D2D synchronization signal is sent for the first time.

The PD2DSS and/or SD2DSS that is used for indicating the synchronization source identifier and that is in the D2D synchronization signal is converted, which may avoid a problem that multiple adjacent synchronization sources carry a same synchronization source identifier, so as to avoid a co-channel interference and to facilitate detection on adjacent synchronization source identifiers.

In this embodiment, when the device serves as a synchronization source, when the first D2D synchronization information is sent, a downlink synchronization signal from a network may be received, or a synchronization signal from another synchronization source may be received. In actual application, because a signal on a transmitter device submerges a signal on a receiver, a device cannot send and receive a signal on a same time resource.

Figure 8A:
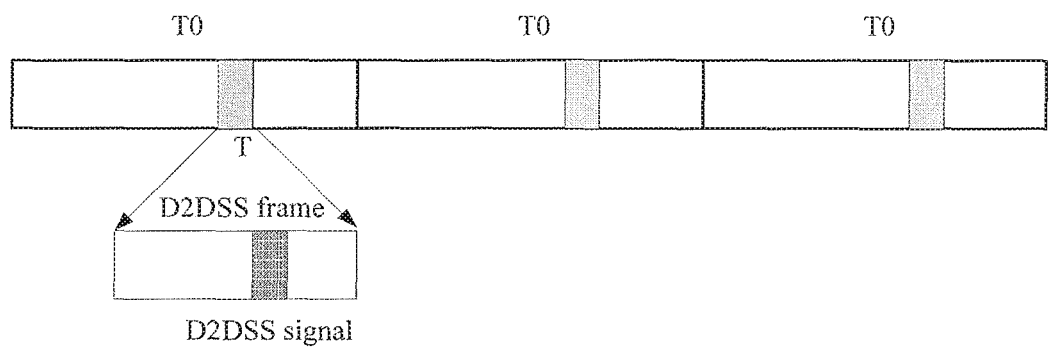
FIG. 8a is a schematic structural diagram of an existing D2D synchronization signal.

For example, as shown in FIG. 8a, in the prior art, it is specified that at a fixed location in each long cycle T0, a D2D synchronization signal frame and a corresponding D2D synchronization signal appear; if UE needs to both send and receive a D2D synchronization signal at the fixed location, the UE cannot work on a channel used for a D2D synchronization signal.

To avoid mutual interference caused by that the device receives and sends a D2D synchronization signal on a same time resource, the following three optional implementation manners are used:

Manner 1: When a D2D synchronization signal is received by using any one of radio frames used for sending a D2D synchronization signal, a D2D synchronization signal is transmitted by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Figure 8B:
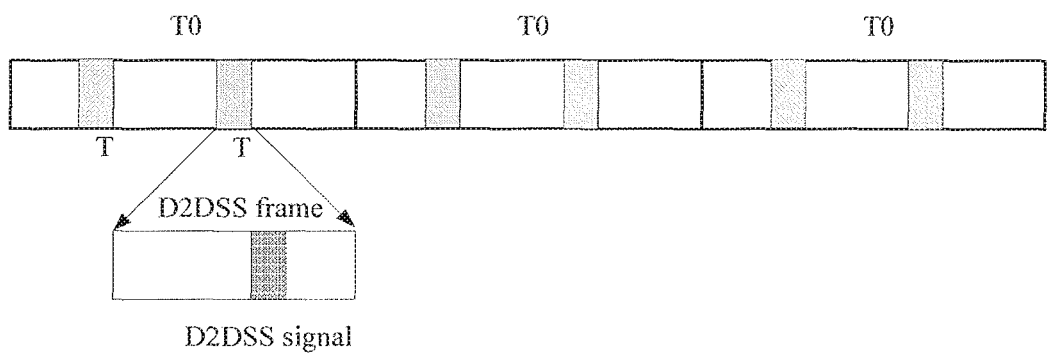
FIG. 8b is a schematic structural diagram in which two D2D synchronization signal transmission frames are configured in each T0 cycle.

For example, as shown in FIG. 8b, in each long cycle T0, multiple radio frames used for a D2D synchronization signal are configured. Assuming that T0 is one second, the multiple radio frames used for a D2D synchronization signal may be configured in too radio frames, and in each radio frame used for a D2D synchronization signal, only one resource used for a D2D synchronization signal is configured.

Manner 2: When a D2D synchronization signal is received by using any resource that is used for a D2D synchronization signal and that is included in a radio frame used for sending a D2D synchronization signal, a D2D synchronization signal is sent by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Figure 8C:
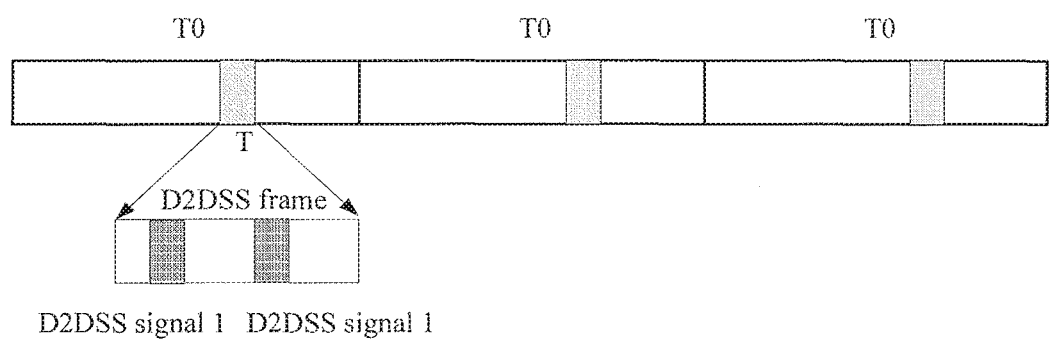
FIG. 8c is a schematic structural diagram in which a total of two independent transmission windows are included in each D2D synchronization signal transmission frame.

For example, as shown in FIG. 8c, in each long cycle T0, two independent D2D synchronization signal frame sending windows are configured. When receiving a D2D synchronization signal, UE may track both of the two sending windows, to detect the D2D synchronization signal. After determining that the UE needs to synchronize timing to the D2D synchronization signal of either of the sending windows, the UE also needs to send a D2D synchronization signal. In this case, when tracking the sending window corresponding to the D2D synchronization signal to which timing of the UE synchronizes, the UE sends another D2D synchronization signal on the other sending window.

The radio frame used for sending a D2D synchronization signal may be one radio frame, or may be multiple radio frames that are consecutive or inconsecutive in time.

Manner 3: After it is determined that a D2D synchronization signal needs to be sent, only the D2D synchronization signal is sent within a set quantity of transmission cycles, and no D2D synchronization signal is received within the set quantity of transmission cycles.

Figure 8D:
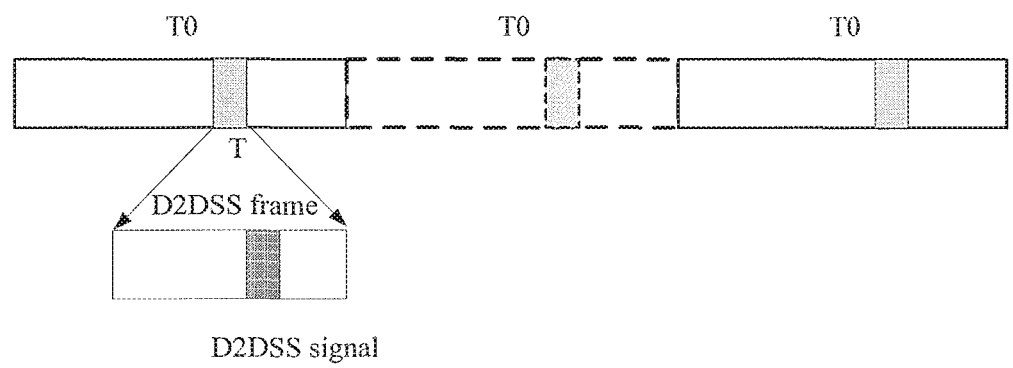
FIG. 8d is a schematic structural diagram in which a transmission frame for sending a D2D synchronization signal is used as a silent period for receiving.

For example, as shown in FIG. 8d, after UE receives a D2D synchronization signal in the first T0 cycle, a receiver of the UE does not receive data from any synchronization source in the second T0 cycle, that is, uses the second T0 as a silent period for receiving, and only transmits a D2D synchronization signal. After successful transmission, the UE receives a D2D synchronization signal in a next T0 cycle.

Figure 9:
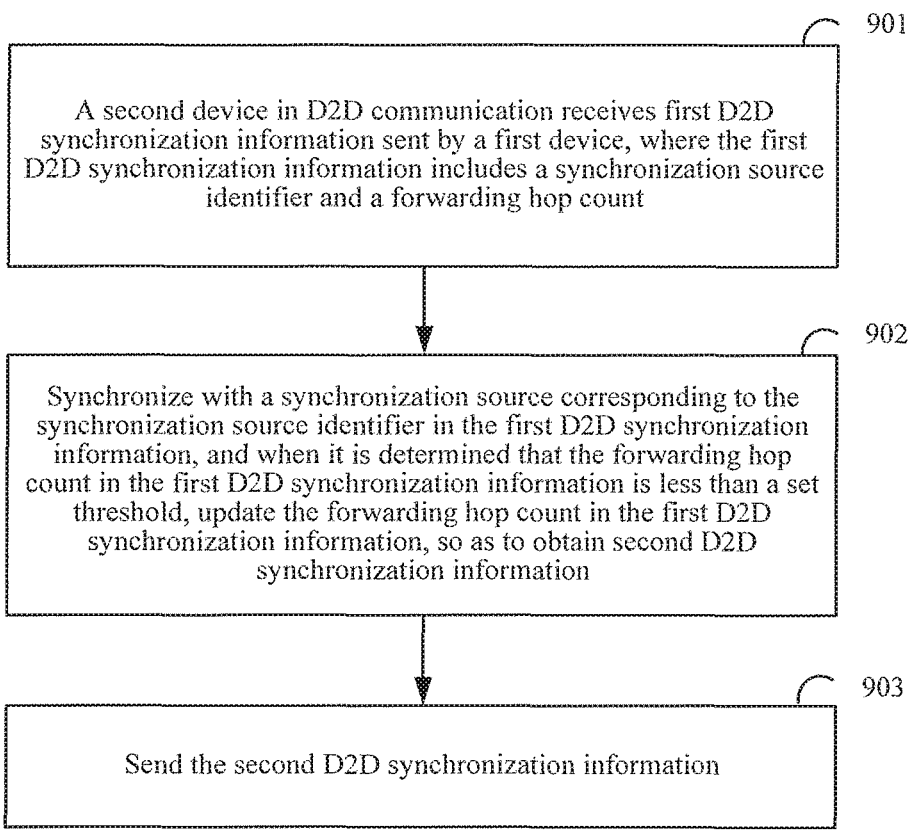
FIG. 9 is a schematic diagram of a device synchronization method in D2D communication according to Embodiment 6.

In Embodiment 6, as shown in FIG. 9, a device synchronization method in D2D communication is provided based on a same principle, where the method mainly includes the following steps.

Step 901: A second device in D2D communication receives first D2D synchronization information sent by a first device, where the first D2D synchronization information includes a synchronization source identifier and a forwarding hop count.

Step 902: Synchronize with a synchronization source corresponding to the synchronization source identifier in the first D2D synchronization information, and when it is determined that the forwarding hop count in the first D2D synchronization information is less than a set threshold, update the forwarding hop count in the first D2D synchronization information, so as to obtain second D2D synchronization information.

Step 903: Send the second D2D synchronization information.

Optionally, the first D2D synchronization information is carried in a D2D synchronization signal sent by the another device; or the first D2D synchronization information includes first-part D2D synchronization information and second-part D2D synchronization information, where the first-part D2D synchronization information is carried in a D2D synchronization signal sent by the first device, and the second-part D2D synchronization information is sent by the first device through a physical D2D synchronization channel PD2DSCH.

A transmission cycle of the D2D synchronization signal and a transmission cycle of the PD2DSCH are different.

Optionally, the D2D synchronization signal includes a primary D2D synchronization signal PD2DSS and/or a secondary D2D synchronization signal SD2DSS.

Corresponding to Embodiment 5, in this embodiment, there may be the following several optional implementation manners according to different manners in which the synchronization information carries the synchronization source identifier and the forwarding hop count:

Manner 1: Corresponding to the first implementation manner provided in Embodiment 5, a synchronization source identifier that is corresponding to the SD2DSS and that is carried in the received D2D synchronization signal is determined according to a preset correspondence between an SD2DSS and a synchronization source identifier; and synchronization is performed with a synchronization source corresponding to the determined synchronization source identifier, a forwarding hop count that is corresponding to the PD2DSS and that is carried in the received D2D synchronization signal is determined according to a preset correspondence between a PD2DSS and a forwarding hop count; and when the determined forwarding hop count is less than the set threshold, a sum of the determined forwarding hop count and a set value is used as a current forwarding hop count; a PD2DSS corresponding to the current forwarding hop count is determined according to the preset correspondence between a PD2DSS and a forwarding hop count; and after the PD2DSS in the received D2D synchronization signal is replaced with the determined PD2DSS, a D2D synchronization signal with the replaced PD2DSS is used as the second D2D synchronization information.

Manner 2: Corresponding to the second implementation manner provided in Embodiment 5, indication information of the synchronization source identifier is received based on the PD2DSCH; the synchronization source identifier is determined according to the indication information of the synchronization source identifier; and synchronization is performed with a synchronization source corresponding to the determined synchronization source identifier; a forwarding hop count that is corresponding to the PD2DSS and that is carried in the received D2D synchronization signal is determined according to a preset correspondence between a PD2DSS and a forwarding hop count; and when the determined forwarding hop count is less than the set threshold, a sum of the determined forwarding hop count and a set value is used as a current forwarding hop count; a PD2DSS corresponding to the current forwarding hop count is determined according to the preset correspondence between a PD2DSS and a forwarding hop count; the PD2DSS in the received D2D synchronization signal is replaced with the determined PD2DSS; and a D2D synchronization signal obtained after PD2DSS replacement is used as first-part D2D synchronization information of the second D2D synchronization information, and the indication information of the synchronization source identifier is used as second-part D2D synchronization information that is sent through the PD2DSCH and that is of the second D2D synchronization information, to obtain the second D2D synchronization information.

Manner 3: Corresponding to the third implementation manner provided in Embodiment 5, a synchronization source identifier that is corresponding to the SD2DSS carried in the received D2D synchronization signal is determined according to a preset correspondence between an SD2DSS and a synchronization source identifier; and synchronization is performed with a synchronization source corresponding to the determined synchronization source identifier; and indication information of the forwarding hop count is received based on the PD2DSCH; the forwarding hop count is determined according to the indication information of the forwarding hop count; when the determined forwarding hop count is less than the set threshold, a sum of the determined forwarding hop count and a set value is used as a current forwarding hop count; and the synchronization signal that carries the SD2DSS is used as first-part D2D synchronization information of the second D2D synchronization information, and indication information of the current forwarding hop count is used as second-part D2D synchronization information that is sent through the PD2DSCH and that is of the second D2D synchronization information, to obtain the second D2D synchronization information.

Manner 4: Corresponding to the fourth implementation manner provided in Embodiment 5, a synchronization source identifier and a forwarding hop count that are carried in the D2D synchronization signal and that are corresponding to the SD2DSS are determined according to a preset correspondence between an SD2DSS and a synchronization source identifier and between an SD2DSS and a forwarding hop count; and synchronization is performed with a synchronization source corresponding to the determined synchronization source identifier; and when the determined forwarding hop count is less than the set threshold, a sum of the determined forwarding hop count and a set value is used as a current forwarding hop count; an SD2DSS corresponding to the synchronization source identifier and the current forwarding hop count is determined according to the preset correspondence between an SD2DSS and a synchronization source identifier and between an SD2DSS and a forwarding hop count; the SD2DSS in the D2D synchronization signal is replaced with the determined SD2DSS; and a D2D synchronization signal obtained after SD2DSS replacement is used as the second D2D synchronization information.

Specifically, the preset correspondence between an SD2DSS and a synchronization source identifier and between an SD2DSS and a forwarding hop count includes: the preset correspondence between an SD2DSS and a forwarding hop count satisfying $N_k=\mathrm{mod}(N_{ID}^{(2)},K)$, where $N_k$ represents a forwarding hop count, $N_{ID}^{(2)}$ represents a sequence number of an SD2DSS, K represents a preset maximum value of the forwarding hop count, and mod represents a modulo operation; and the preset correspondence between an SD2DSS and a synchronization source identifier satisfying $N_{ID}=\mathrm{floor}(N_{ID}^{(2)}/K)$, where $N_{ID}$ represents a synchronization source identifier, $N_{ID}^{(2)}$ represents a sequence number of an SD2DSS, K represents a preset maximum value of the forwarding hop count, and floor represents a rounding down operation.

Manner 5: Corresponding to the fifth implementation manner provided in Embodiment 5, a synchronization source identifier that is corresponding to a combination of the PD2DSS and the SD2DSS and that is carried in the received D2D synchronization signal is determined according to a preset correspondence between a synchronization source identifier and a combination of a PD2DSS and an SD2DSS; and synchronization is performed with a synchronization source corresponding to the determined synchronization source identifier; and indication information of the forwarding hop count is received based on the PD2DSCH; the forwarding hop count is determined according to the indication information of the forwarding hop count; when the determined forwarding hop count is less than the set threshold, a sum of the determined forwarding hop count and a set value is used as a current forwarding hop count; and the D2D synchronization signal is used as first-part D2D synchronization information of the second synchronization information, and indication information of the current forwarding hop count is used as second-part D2D synchronization information that is sent through the PD2DSCH and that is of the second D2D synchronization information, to obtain the second D2D synchronization information.

Specifically, the preset correspondence between a synchronization source identifier and a combination of a PD2DSS and an SD2DSS includes: the preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \leq N_{ID}^{(1)} \leq (M_s-1)$, $0 \leq N_{ID}^{(2)} \leq (N_s-1)$, $M_s$ represents a maximum quantity of PD2DSSes, and $N_s$ represents a maximum quantity of SD2DSSes.

Manner 6: Corresponding to the sixth implementation manner provided in Embodiment 5, a synchronization source identifier that is corresponding to a PD2DSS-SD2DSS group to which a combination of the PD2DSS and the SD2DSS carried in the received D2D synchronization signal belongs is determined according to a preset correspondence between a synchronization source identifier and a PD2DSS-SD2DSS group; and synchronization is performed with a synchronization source corresponding to the determined synchronization source identifier; and a forwarding hop count that is corresponding to the SD2DSS in the combination of the PD2DSS and the SD2DSS carried in the received D2D synchronization signal is determined according to a preset correspondence between an SD2DSS and a forwarding hop count; when the determined forwarding hop count is less than the set threshold, a sum of the determined forwarding hop count and a set value is used as a current forwarding hop count; an SD2DSS corresponding to the current forwarding hop count is acquired according to the preset correspondence between an SD2DSS and a forwarding hop count; a combination of a PD2DSS and an SD2DSS that is corresponding to the acquired SD2DSS and that is included in the PD2DSS-SD2DSS group to which the combination of the PD2DSS and the SD2DSS carried in the received D2D synchronization signal belongs is determined; the combination of the PD2DSS and the SD2DSS in the D2D synchronization signal is replaced with the determined combination of the PD2DSS and the SD2DSS; and a D2D synchronization signal obtained after replacement of the combination of the PD2DSS and the SD2DSS is used as the second D2D synchronization information.

Optionally, a number of the PD2DSS-SD2DSS group is used to indicate a synchronization source identifier; and a sequence number of the SD2DSS is used to indicate a forwarding hop count in a D2D synchronization signal corresponding to the synchronization source identifier indicated by a number of a PD2DSS-SD2DSS group to which the SD2DSS belongs.

Specifically, the preset correspondence between a synchronization source identifier and a PD2DSS-SD2DSS group includes: a preset correspondence between a synchronization source identifier and a combination of a PD2DSS and an SD2DSS satisfying $N_{ID}=M_s N_{ID}^{(1)}+N_{ID}^{(2)}$, where $N_{ID}$ represents a synchronization source identifier, $N_{ID}^{(1)}$ represents a sequence number of a PD2DSS, $N_{ID}^{(2)}$ represents a sequence number of an SD2DSS, $0 \le N_{ID}^{(1)} \le (M_s-1)$, $0 \le N_{ID}^{(2)} \le (N_s-1)$, $M_s$ represents a maximum quantity of PD2DSSes, $N_s$ is obtained by rounding down a value obtained after a maximum value of the sequence number of the SD2DSS is divided by a maximum value of a forwarding hop count; and each combination of a PD2DSS and an SD2DSS that corresponds to a same synchronization source identifier belongs to one PD2DSS-SD2DSS group, and a number of the PD2DSS-SD2DSS group is the corresponding synchronization source identifier.

In a specific embodiment, a device in D2D communication may simultaneously receive multiple pieces of first D2D synchronization information. In this case, one piece of the first D2D synchronization information needs to be selected according to a preset selection rule and synchronization is performed.

The first D2D synchronization information further carries a synchronization source type. Specifically, the synchronization source type may be indicated by using a D2D synchronization signal or a PD2DSCH.

For example, UE within a network coverage area sends a D2D synchronization signal on a D2D resource, and indicates, by using the PD2DSCH, that a synchronization source type is an LTE network.

In this embodiment, the synchronization source type may be a network, a device, a global positioning system (GPS), or the like.

When multiple pieces of first D2D synchronization information are received, there are the following two processing manners according to synchronization source types carried in the pieces of first D2D synchronization information.

Manner 1: Multiple pieces of first D2D synchronization information are received, and it is determined, according to synchronization source types carried in the multiple pieces of first D2D synchronization information, that the multiple pieces of first D2D synchronization information are of a same synchronization source type. For example, it is determined, according to the synchronization source types, that the pieces of first D2D synchronization information come from different devices in D2D communication, or it is determined, according to the synchronization source types, that the pieces of first D2D synchronization information come from a network side.

Preferably, performing selection according to forwarding hop counts carried in the first D2D synchronization information includes: receiving the first D2D synchronization information; when determining that more than one piece of first D2D synchronization information is received, separately acquiring forwarding hop counts carried in the received pieces of first D2D synchronization information; determining a minimum value of the acquired forwarding hop counts; and when determining that the minimum value is less than the set threshold, synchronizing with a synchronization source corresponding to a synchronization source identifier in first D2D synchronization information corresponding to the minimum value.

Further, if the minimum value is corresponding to more than one piece of first D2D synchronization information, signal strengths of the first D2D synchronization information corresponding to the minimum value are determined, and synchronization is performed according to first D2D synchronization information corresponding to a greatest value of the signal strengths.

Similarly, in this specific embodiment, if it is determined that the forwarding hop counts carried in the pieces of received first D2D synchronization information are the same and the forwarding hop counts are less than the set threshold, signal strengths of the pieces of first D2D synchronization information are determined, and synchronization is performed according to first D2D synchronization information corresponding to a greatest value of the signal strengths.

Preferably, in this specific embodiment, after the forwarding hop counts carried in the pieces of first D2D synchronization information are acquired, if it is determined that a minimum value of the forwarding hop counts is not less than the set threshold, all the first D2D synchronization information is discarded. Optionally, first D2D synchronization information sent by another device is received within set duration. If it is determined that the first D2D synchronization information is not received within the set duration, the second D2D synchronization information is generated by using the device a synchronization source and an identifier of the device as a synchronization source identifier and by setting the current forwarding hop count to an initial value, and the second D2D synchronization information is sent, so that other adjacent devices and the device are synchronized in time and frequency.

Figure 10:
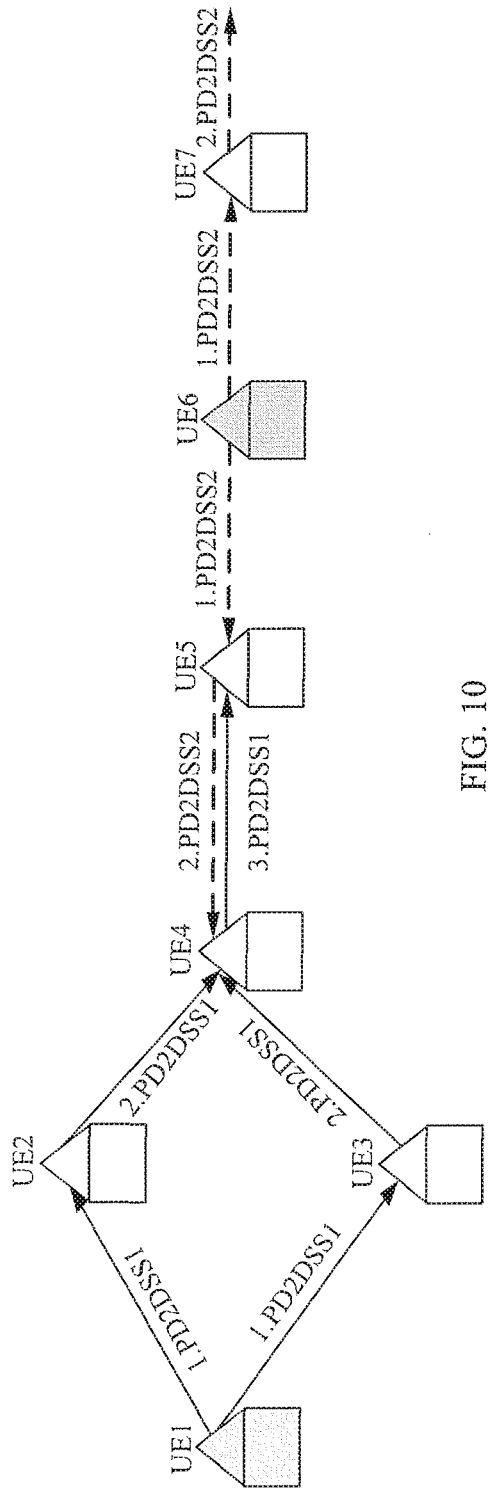
FIG. 10 shows an example of synchronously receiving multiple D2D synchronization signals according to an embodiment.

For example, as shown in FIG. 10, it is assumed that PD2DSSes of D2D synchronization signals of a same synchronization source are the same, and that a maximum forwarding hop count is 3. A D2D synchronization signal from UE 1 carries a PD2DSS 1; the D2D synchronization signal is forwarded to UE 2 and UE 3 via a first hop, forwarded separately by the UE 2 and the UE 3 to UE 4 through second-hop forwarding, and forwarded by the UE 4 to UE 5 through third-hop forwarding; the UE 5 does not forward the D2D synchronization signal. UE 6, as a synchronization source, sends a D2D synchronization signal carrying the PD2DSS 1, and the D2D synchronization signal is forwarded to the UE 5 and UE 7 by using a first hop; if the UE 5 also forwards the D2D synchronization signal to the UE 4 via a second hop, the UE 4 may receive the D2D synchronization signals from two different synchronization sources, and forwarding hop counts of the two D2D synchronization signals are the same and are both the second hop. Because the UE 4 simultaneously receives the D2D synchronization signal that is from the synchronization source UE 1 and that is forwarded by the UE 2 and the UE 3 via the second hop, it is determined that a strength of the D2D synchronization signal from the synchronization source UE is greater than a strength of the D2D synchronization signal that is from the synchronization source UE 6 and that is forwarded via the second hop. Therefore, the UE 4 performs synchronization according to the D2D synchronization signal of which the synchronization source is the UE 1.

Manner 2: Multiple pieces of first D2D synchronization information are received, and it is determined, according to synchronization source types carried in the multiple pieces of first D2D synchronization information, that the multiple pieces of first D2D synchronization information are of different synchronization source types. For example, it is determined, according to the synchronization source types, that one piece of the first D2D synchronization information comes from a network side, or that the other pieces of the first D2D synchronization information come from different devices in D2D communication respectively.

Preferably, when it is determined that more than one piece of first D2D synchronization information is received, first D2D synchronization information in which a synchronization source is a network is determined according to synchronization source types carried in the D2D synchronization signals, and synchronization is performed according to the determined first D2D synchronization information.

Preferably, after the first D2D synchronization information in which the synchronization source is a network is determined, a forwarding hop count carried in the determined first D2D synchronization information in which the synchronization source is a network is acquired; and if it is determined that the forwarding hop count is less than the set threshold, synchronization is performed according to the determined first D2D synchronization information in which the synchronization source is a network; or if it is determined that the forwarding hop count is not less than the set threshold, one piece of the first D2D synchronization information is selected from the other pieces of the first D2D synchronization information in the foregoing first processing manner and synchronization is performed.

The preset threshold is set in advance. In actual application, the preset threshold may be determined according to synchronization precision on a network side and a reduction value of synchronization precision caused by each time of forwarding (a forwarding hop count of one) between devices, that is, it is ensured that synchronization precision corresponding to the preset threshold is higher than a threshold, so as to ensure synchronization precision between devices in D2D communication, and also to avoid a reduction of stability caused when excessive devices synchronize with a same synchronization source.

Optionally, after the second device in D2D communication receives the D2D synchronization information in which the synchronization source type is a network, if the second device has synchronized with another synchronization source type (for example, another device in D2D communication) before, the device turns to synchronize with the network. Preferably, after the device turns to synchronize with the network, a greatest value of the forwarding hop count is reset, and the D2D synchronization information in which the synchronization source type is a network is forwarded according to a changed forwarding hop count.

Specifically, after synchronization is performed according to the determined first D2D synchronization information in which the synchronization source is a network, a greatest value of the forwarding hop counts is updated, where a greatest value of the forwarding hop counts that is obtained after the update is greater than the greatest value of the forwarding hop counts that exists before the update. When it is determined that the forwarding hop count carried in the first D2D synchronization information is less than the greatest value of the forwarding hop counts that is obtained after the update, the forwarding hop count in the first D2D synchronization information is updated, to obtain the second D2D synchronization information. The second D2D synchronization information is sent, and the greatest value, obtained after the update, of the forwarding hop counts is also sent.

In actual application, because a signal on a transmitter device submerges a signal on a receiver, a device cannot send and receive a signal on a same time resource. To avoid that the device receives and sends a D2D synchronization signal on a same time resource, the following three optional implementation manners are used.

Manner 1: When a D2D synchronization signal is received by using any one of radio frames used for sending a D2D synchronization signal, a D2D synchronization signal is transmitted by using any one of the other radio frames used for sending a D2D synchronization signal, where two or more radio frames used for sending a D2D synchronization signal are configured for each transmission cycle, and in each radio frame used for sending a D2D synchronization signal, only one resource used for a D2D synchronization signal is configured.

Manner 2: When a D2D synchronization signal is received by using any resource that is used for a D2D synchronization signal and that is included in a radio frame used for sending a D2D synchronization signal, a D2D synchronization signal is sent by using any one of the other resources that are used for a D2D synchronization signal and that are included in the radio frame, where one or more radio frames used for sending a D2D synchronization signal are configured for each transmission cycle, and in each radio frame used for sending a D2D synchronization signal, two or more resources used for a D2D synchronization signal are configured.

Manner 3: After it is determined that a D2D synchronization signal needs to be sent, only the D2D synchronization signal is sent within a set quantity of transmission cycles, and no D2D synchronization signal is received within the set quantity of transmission cycles.

Based on the foregoing technical solutions, in the embodiments, a device in D2D communication receives D2D synchronization information sent by another device, and synchronizes with a synchronization source corresponding to a synchronization source identifier carried in the D2D synchronization information, to implement synchronization between the device and the another device; and when determining that a forwarding hop count carried in the D2D synchronization information does not exceed a set threshold, updates the forwarding hop count in the D2D synchronization information, and sends updated D2D synchronization information, so that a device adjacent to the device can synchronize with the device, thereby implementing synchronization between devices in D2D communication. In addition, complexity of communication between devices may be effectively controlled by limiting a forwarding hop count. D2D synchronization information that has a same forwarding hop count and that is from a same synchronization source may be received after combination, so as to obtain a single frequency network (Single Frequency Network, SFN) receive gain.

A person skilled in the art should understand that the embodiments may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A second device, comprising:
   a receiver, configured to:
      receive first device-to-device (D2D) synchronization information sent by a first device in a D2D communication, wherein the first D2D synchronization information comprises a secondary D2D synchronization signal (SD2DSS);
   a processor, configured to:
      determine a synchronization source identifier and a forwarding hop count according to a preset correspondence between the SD2DSS and the synchronization source identifier and a preset correspondence between the SD2DSS and the forwarding hop count, synchronize with a synchronization source corresponding to the synchronization source identifier, and update the forwarding hop count in the first D2D synchronization information in response to determining that the forwarding hop count in the first D2D synchronization information is less than a set threshold, to obtain second D2D synchronization information; and
   a transmitter, configured to send the second D2D synchronization information.

2. The second device according to claim 1, wherein:
the first D2D synchronization information received by the receiver comprises first-part D2D synchronization information and second-part D2D synchronization information, wherein the first-part D2D synchronization information is carried in a D2D synchronization signal sent by the first device, and the second-part D2D synchronization information is sent by the first device through a physical D2D synchronization channel (PD2DSCH).

3. The second device according to claim 2, wherein the receiver is configured to receive a D2D synchronization signal using a first resource that is used for a D2D synchronization signal and that is comprised in a radio frame used for sending a D2D synchronization signal; and
   wherein the transmitter is configured to send a D2D synchronization signal using a second resource that is used for a D2D synchronization signal and that is comprised in the radio frame, wherein radio frames for sending a D2D synchronization signal are configured for each transmission cycle, and in each radio frame used for sending a D2D synchronization signal, a plurality of resources used for a D2D synchronization signal are configured, and wherein the first resource is different than the second resource.

4. The second device according to claim 2, wherein the transmitter is configured to, after determining that a D2D synchronization signal needs to be sent, send only the D2D synchronization signal within a set quantity of transmission cycles; and
   wherein the receiver does not receive any D2D synchronization signal within the set quantity of transmission cycles.

5. The second device according to claim 1, wherein the processor is further configured to:
   in response to determining that the receiver received a plurality of pieces of first D2D synchronization information, separately determine forwarding hop counts based on a preset correspondence between corresponding pieces of the first D2D synchronization information and the forwarding hop counts;
   determine a minimum value of the acquired forwarding hop counts; and
   in response to determining that the minimum value is less than the set threshold, synchronize with a synchronization source corresponding to a synchronization source identifier in the piece of first D2D synchronization information that corresponds to the minimum value.

6. The second device according to claim 5, wherein the processor is further configured to:
   in response to the minimum value corresponding to more than one piece of first D2D synchronization information, determine signal strengths of each piece of first D2D synchronization information that corresponds to the minimum value, and perform synchronization according to the piece of first D2D synchronization information that corresponds to a greatest value of the determined signal strengths.

7. A device, comprising:
a processor, configured to:
determine a synchronization source identifier and a forwarding hop count;
encapsulate the determined synchronization source identifier and forwarding hop count into first device-to-device (D2D) synchronization information;
acquire a secondary D2D synchronization signal (SD2DSS) corresponding to the determined synchronization source identifier and forwarding hop count, according to a preset correspondence between the SD2DSS and the synchronization source identifier and between the SD2DSS and the forwarding hop count;
add the SD2DSS to a D2D synchronization signal, and use the D2D synchronization signal as the first D2D synchronization information; and
a transmitter, configured to send the first D2D synchronization information in the D2D synchronization signal.

8. The device according to claim 7, wherein:
the first D2D synchronization information further comprises a synchronization source type;
the device further comprises a receiver;
the processor is further configured to:
scan a downlink synchronization signal sent by a network;
in response to determining that the processor has not detected the downlink synchronization signal, instruct the transmitter to send the first D2D synchronization information; and
in response to determining that the processor has detected the downlink synchronization signal, determine that the receiver has received third D2D synchronization information sent by another device, determine, according to a synchronization source type in the third D2D synchronization information, that a synchronization source is not a network device, and instruct the transmitter to send the first D2D synchronization information.

9. The device according to claim 8, wherein a time-frequency resource occupied by the first D2D synchronization information that is sent by the transmitter is different from a time-frequency resource occupied by the downlink synchronization signal that is sent by the network and that is received by the receiver.

10. The device according to claim 8, wherein the D2D synchronization signal carries first-part D2D synchronization information of the first D2D synchronization information; and wherein the transmitter is further configured to send second-part D2D synchronization information of the first D2D synchronization information through a physical D2D synchronization channel (PD2DSCH), wherein the first-part D2D synchronization information and the second-part D2D synchronization information are combined into the first D2D synchronization information.

11. The device according to claim 10, wherein the D2D synchronization signal comprises a primary D2D synchronization signal (PD2DSS) and a secondary D2D synchronization signal (SD2DSS).

12. The device according to claim 10, wherein the receiver is configured to:
receive a D2D synchronization signal comprised in one or more first radio frames used for sending a D2D synchronization signal; and
wherein the transmitter is configured to transmit a D2D synchronization signal by using one or more second radio frames used for sending a D2D synchronization signal, wherein a plurality of radio frames used for sending a D2D synchronization signal are configured for each transmission cycle, and in each radio frame used for sending a D2D synchronization signal, only one resource used for a D2D synchronization signal is configured, and wherein the first radio frames are different than the second radio frames.

13. The device according to claim 10, wherein the transmitter is configured to, after determining that a D2D synchronization signal needs to be sent, send only the D2D synchronization signal within a set quantity of transmission cycles; and
wherein the receiver does not receive any D2D synchronization signal within the set quantity of transmission cycles.

14. The device according to claim 8, wherein the transmitter is configured to, after determining that a D2D synchronization signal needs to be sent, send only the D2D synchronization signal within a set quantity of transmission cycles; and
wherein the receiver does not receive any D2D synchronization signal within the set quantity of transmission cycles.

15. A device, comprising:
a processor, configured to:
determine a synchronization source identifier and a forwarding hop count,
encapsulate the determined synchronization source identifier and forwarding hop count into first device-to-device (D2D) synchronization information,
acquire a primary D2D synchronization signal (PD2DSS)-secondary D2D synchronization signal (SD2DSS) group corresponding to the determined synchronization source identifier, according to a preset correspondence between a synchronization source identifier and a PD2DSS-SD2DSS group, wherein each PD2DSS-SD2DSS group comprises multiple combinations of a PD2DSS and an SD2DSS,
acquire an SD2DSS corresponding to the determined forwarding hop count, according to a preset correspondence between an SD2DSS and a forwarding hop count,
determine a combination of a PD2DSS and an SD2DSS that comprises the acquired SD2DSS and that is in the acquired PD2DSS-SD2DSS group, and
add the determined combination of a PD2DSS and an SD2DSS to the D2D synchronization signal, and use the D2D synchronization signal as the first D2D synchronization information; and
a transmitter, configured to send the first D2D synchronization information in the D2D synchronization signal.

16. The device according to claim 15, wherein:
the first D2D synchronization information further comprises a synchronization source type;
the device further comprises a receiver;
the processor is further configured to:
scan a downlink synchronization signal sent by a network;
in response to determining that the processor has not detected the downlink synchronization signal, instruct the transmitter to send the first D2D synchronization information; and
in response to determining that the processor has detected the downlink synchronization signal, determine that the receiver has received third D2D synchronization information sent by another device, determine, according to a synchronization source type in the third D2D synchronization information, that a synchronization source is not a network device, and instruct the transmitter to send the first D2D synchronization information.

17. The device according to claim 16, wherein a time-frequency resource occupied by the first D2D synchronization information that is sent by the transmitter is different from a time-frequency resource occupied by the downlink synchronization signal that is sent by the network and that is received by the receiver.

18. The device according to claim 16, wherein the D2D synchronization signal carries first-part D2D synchronization information of the first D2D synchronization information; and wherein the transmitter is further configured to send second-part D2D synchronization information of the first D2D synchronization information through a physical D2D synchronization channel (PD2DSCH), wherein the first-part D2D synchronization information and the second-part D2D synchronization information are combined into the first D2D synchronization information.

19. The device according to claim 15, wherein the receiver is configured to:
   receive a D2D synchronization signal comprised in one or more first radio frames used for sending a D2D synchronization signal; and
   wherein the transmitter is configured to transmit a D2D synchronization signal by using one or more second radio frames used for sending a D2D synchronization signal, wherein a plurality of radio frames used for sending a D2D synchronization signal are configured for each transmission cycle, and in each radio frame used for sending a D2D synchronization signal, only one resource used for a D2D synchronization signal is configured, and wherein the first radio frames are different than the second radio frames.

20. The device according to claim 15, wherein the transmitter is configured to, after determining that a D2D synchronization signal needs to be sent, send only the D2D synchronization signal within a set quantity of transmission cycles; and
   wherein the receiver does not receive any D2D synchronization signal within the set quantity of transmission cycles.

* * * * *